US012608469B2

(12) United States Patent
Zhang et al.

(10) Patent No.: US 12,608,469 B2
(45) **Date of Patent: \*Apr. 21, 2026**

(54) SYSTEMS AND METHODS FOR STORAGE SYSTEM ATTACK DETECTION AND RESPONSE

(71) Applicant: Dell Products, L.P., Round Rock, TX (US)

(72) Inventors: Weibing Zhang, Beijing (CN); Lei Gao, Beijing (CN); Chen Gong, Beijing (CN); Wai Yim, Merrimack, NH (US)

(73) Assignee: Dell Products, L.P., Round Rock, TX (US)

( * ) Notice: Subject to any disclaimer, the term of this patent is extended or adjusted under 35 U.S.C. 154(b) by 378 days.

This patent is subject to a terminal disclaimer.

(21) Appl. No.: 18/183,983

(22) Filed: Mar. 15, 2023

(65) Prior Publication Data

US 2024/0311472 A1     Sep. 19, 2024

(51) Int. Cl.
G06F 21/55 (2013.01)

(52) U.S. Cl.
CPC ...... G06F 21/554 (2013.01); G06F 2221/034 (2013.01)

(58) Field of Classification Search
CPC ......................... G06F 21/554; G06F 2221/034
See application file for complete search history.

(56) References Cited

U.S. PATENT DOCUMENTS

| | | | | |
|---|---|---|---|---|
| 10,650,146 B1 * | 5/2020 | Gaurav | ................. | G06F 21/562 |
| 11,663,336 B1 * | 5/2023 | Armangau | .............. | G06F 21/60 |
| | | | | 726/23 |
| 11,968,221 B2 * | 4/2024 | Jadav | ..................... | G06N 20/20 |

(Continued)

FOREIGN PATENT DOCUMENTS

CN           114254307 A  *  3/2022   ............. G06F 21/55

OTHER PUBLICATIONS

Donglei Wang, et al., "Method, Electronic Device, and Computer Program Product for Snapshot Classification," Chinese Application No. 202211132018.8, filed Sep. 16, 2022, 35 pages.

(Continued)

*Primary Examiner* — Carl G Colin
(74) *Attorney, Agent, or Firm* — Fogarty LLP

(57) ABSTRACT

Systems and methods for storage system attack detection and response are described. In an illustrative, non-limiting embodiment, a method may include: obtaining a plurality of count features corresponding to a respective plurality of time points, where the count features include a plurality of count values for data blocks of a storage object; determining, for a first time point, a plurality of corresponding correlation coefficients between a first count feature for the first time point and other count features for other time points; determining a score for the first time point based, at least in part, on the plurality of corresponding correlation coefficients; determining that the score is less than a predetermined threshold; determining, based on the score being less than the predetermined threshold, that the storage object corre- (Continued)

SERVICE SUBSCRIBE
DATA ATTRIBUTES COLLECTION
ATTACK RESPONSE
ATTACK RECOVERY

170
STORAGE SERVER A
172 TENANT A1
174 TENANT A2

180
STORAGE SERVER B
182 TENANT B1
184 TENANT B2

190
STORAGE SERVER C
192 TENANT C1
194 TENANT C2
196 TENANT B2

115 SERVICE SUBSCRIBE
MASKED DATA ATTRIBUTES
125
RESPONSE TO POTENTIAL ATTACK
135
RANSOMWARE ATTACK RECOVERY
145

100
110 MANAGEMENT SERVER
RANSOMWARE ATTACK DETECTION SERVICE
120 DATA ATTRIBUTES DB
130 REALTIME RANSOMWARE ATTACK DETECTION
140 RANSOMWARE ATTACK RECOVERY
150 OTHER PLUGINS sponding to the first time point is under an attack; and providing information responsive to the attack to a third party.

19 Claims, 13 Drawing Sheets

(56)                          References Cited

U.S. PATENT DOCUMENTS

| | | | |
|---|---|---|---|
| 2015/0180891 A1* | 6/2015 | Seward | H04L 63/1416 |
| | | | 726/22 |
| 2019/0108341 A1* | 4/2019 | Bedhapudi | G06F 16/1734 |
| 2019/0340359 A1* | 11/2019 | Kumar | G06F 16/1748 |
| 2021/0334374 A1* | 10/2021 | Vasudeva | G06F 21/602 |

OTHER PUBLICATIONS

Chen Gong, et al., "Data Detection Method and Electronic Device," Chinese Application No. 202211659610.3, filed Dec. 22, 2022, 35 pages.

\* cited by examiner

300

301 ― ACQUIRING A TARGET DATA BLOCK

302 ― CALCULATING A TARGET DIGEST FOR THE TARGET DATA BLOCK

303 ― MAKING A QUERY AS TO WEATHER THE TARGET DIGEST EXISTS IN A DIGEST CACHE

NO → 305 ― ADDING THE TARGET DIGEST TO THE DIGEST CACHE

YES

304 ― UPDATING A COUNTER

1100

1101

GENERATION MODULE

1102

CLUSTERING MODULE

1103

DETERMINING MODULE

1104

COUNTING MODULE

1105

RECOVERY MODULE

SYSTEMS AND METHODS FOR STORAGE SYSTEM ATTACK DETECTION AND RESPONSE

FIELD

This disclosure relates generally to Information Handling Systems (IHSs), and more specifically, to systems, methods, and service frameworks for storage system attack detection and response.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

With the development and popularization of networks, network security has become more and more important. Users may be exposed to various malicious network attacks, such as ransomware. Ransomware is a type of malicious extortion software that prevents users from accessing files, systems, or networks, until a ransom is get. Malware attacks may lead to interruption of important operations or loss of critical information and data, causing serious impacts and bringing major threats to the security of user data.

Data storage servers are often the target of ransomware attacks. Because ransomware encrypts data and the encrypted data content is random, conventional antivirus methods cannot effectively detect ransomware activities. More and more ransomware variants make it more difficult to detect ransomware activities.

SUMMARY

Systems, methods, and service frameworks for storage system attack detection and response are described. In an illustrative, non-limiting embodiment, an Information Handling System (IHS) may include: a processor; and a memory coupled to the processor, wherein the memory comprises program instructions store thereon that, upon execution by the processor, cause the IHS to: obtain a plurality of count features corresponding to a respective plurality of time points based on data blocks of a storage object, wherein the count features comprise a plurality of count values for the data blocks; determine, for a first time point of the plurality of time points, a plurality of corresponding correlation coefficients between a first count feature for the first time point and other count features of the plurality of count features for other time points of the plurality of time points; determine a score for the first time point based, at least in part, on the plurality of corresponding correlation coefficients; determine that the score is less than a predetermined threshold; determine, based at least in part on the score being less than the predetermined threshold, that the storage object corresponding to the first time point is under an attack; and provide information responsive to the attack to a third party.

In some embodiments, the third party is an entity associated with the storage object, and the program instructions, upon execution by the processor, further cause the IHS to: obtain, from the entity associated with the storage object, a subscription to a service performed by the IHS. In some embodiments, the entity associated with the storage object comprises a storage server storing the storage object. In some embodiments, the attack comprises a ransomware attack. In some embodiments, the information responsive to the attack comprises a command to not delete snapshots corresponding to the storage object.

In some embodiments, the third party is an administrator associated with the storage object, and the responsive information comprises an alert of the attack. In some embodiments, responsive to the determination that the storage object corresponding to the first time point is under the attack, the program instructions, upon execution by the processor, further cause the IHS to: cluster the plurality of count features corresponding to the respective plurality of time points into a first group of count features and a second group of count features, based, at least in part, on the plurality the count values for the data blocks; compare a time point of the first group of count features with a time point of the second group of count features; and determine, based at least in part on the comparison, a second time point of the plurality of time points wherein the storage object corresponding to second time point is not under the attack, and wherein the information responsive to the attack provided to the third party comprises the second time point.

In some embodiments, the program instructions, upon execution by the processor, further cause the IHS to: determine that snapshots of the storage object prior to the second time point are candidate snapshots, wherein the responsive information comprises a command to not delete the candidate snapshots. In some embodiments, the program instructions, upon execution by the processor, further cause the IHS to: determine the plurality of corresponding correlation coefficients based on distances between the first count feature for the first time point and the other count features of the plurality of count features for other time points of the plurality of time points.

In some embodiments, the data blocks are deduplicated data blocks. In some embodiments, the score is an average of the plurality of correlation coefficients.

In another illustrative, non-limiting embodiment, a method of determining an attack on a storage system, comprises: obtaining a plurality of count features corresponding to a respective plurality of time points based on data blocks of a storage object, wherein the count features comprise a plurality of count values for the data blocks; determining, for a first time point of the plurality of time points, a plurality of corresponding correlation coefficients between a first count feature for the first time point and other count features of the plurality of count features for other time points of the plurality of time points; determining a score for the first time point based, at least in part, on the plurality of corresponding correlation coefficients; determining that the score is less than a predetermined threshold; determining, based at least in part on the score being less than the predetermined threshold, that the storage object corresponding to the first time point is under an attack; and providing information responsive to the attack to a third party.

In some embodiments, the data blocks are deduplicated data blocks. In some embodiments, the obtaining the plurality of count features corresponding to the respective plurality of time points based on the data blocks of the storage object further comprises: counting the number of the deduplicated data blocks in the storage object that conform to statistical features at the plurality of time points; and generating the plurality of count features corresponding to the respective plurality of time points, based, at least in part, on the number of the deduplicated data blocks.

In some embodiments, the method further comprises: determining the statistical features of the data blocks prior to counting the number of the deduplicated data blocks in the storage object that conform to the statistical features at the plurality of time points, wherein the statistical features are binary bytes of a predetermined length. In some embodiments, the third party is an entity associated with the storage object, and the method further comprises: obtaining, from the entity associated with the storage object, a subscription to a service performed by the IHS. In some embodiments, the attack comprises a ransomware attack.

In some embodiments, responsive to determining that the storage object corresponding to the first time point is under the attack, the method further comprises: clustering the plurality of count features corresponding to the respective plurality of time points into a first group of count features and a second group of count features, based, at least in part, on the plurality the count values for the data blocks; comparing a time point of the first group of count features with a time point of the second group of count features; and determining, based at least in part on the comparison, a second time point of the plurality of time points wherein the storage object corresponding to second time point is not under the attack, and wherein the information responsive to the attack comprises the second time point.

In some embodiments, the method further comprises: determining that snapshots of the storage object prior to the second time point are candidate snapshots, wherein responsive information comprises a command to not delete the candidate snapshots.

In another illustrative, non-limiting embodiment, a memory is coupled to a processor in an Information Handling System (IHS), where the memory comprises program instructions stored thereon that, upon execution by the processor, cause the IHS to: obtain a plurality of count features corresponding to a respective plurality of time points based on data blocks of a storage object, wherein the count features comprise a plurality of count values for the data blocks; determine, for a first time point of the plurality of time points, a plurality of corresponding correlation coefficients between a first count feature for the first time point and other count features of the plurality of count features for other time points of the plurality of time points; determine a score for the first time point based, at least in part, on the plurality of corresponding correlation coefficients; determine that the score is less than a predetermined threshold; determine, based at least in part on the score being less than the predetermined threshold, that the storage object corresponding to the first time point is under an attack; and provide information responsive to the attack to a third party.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
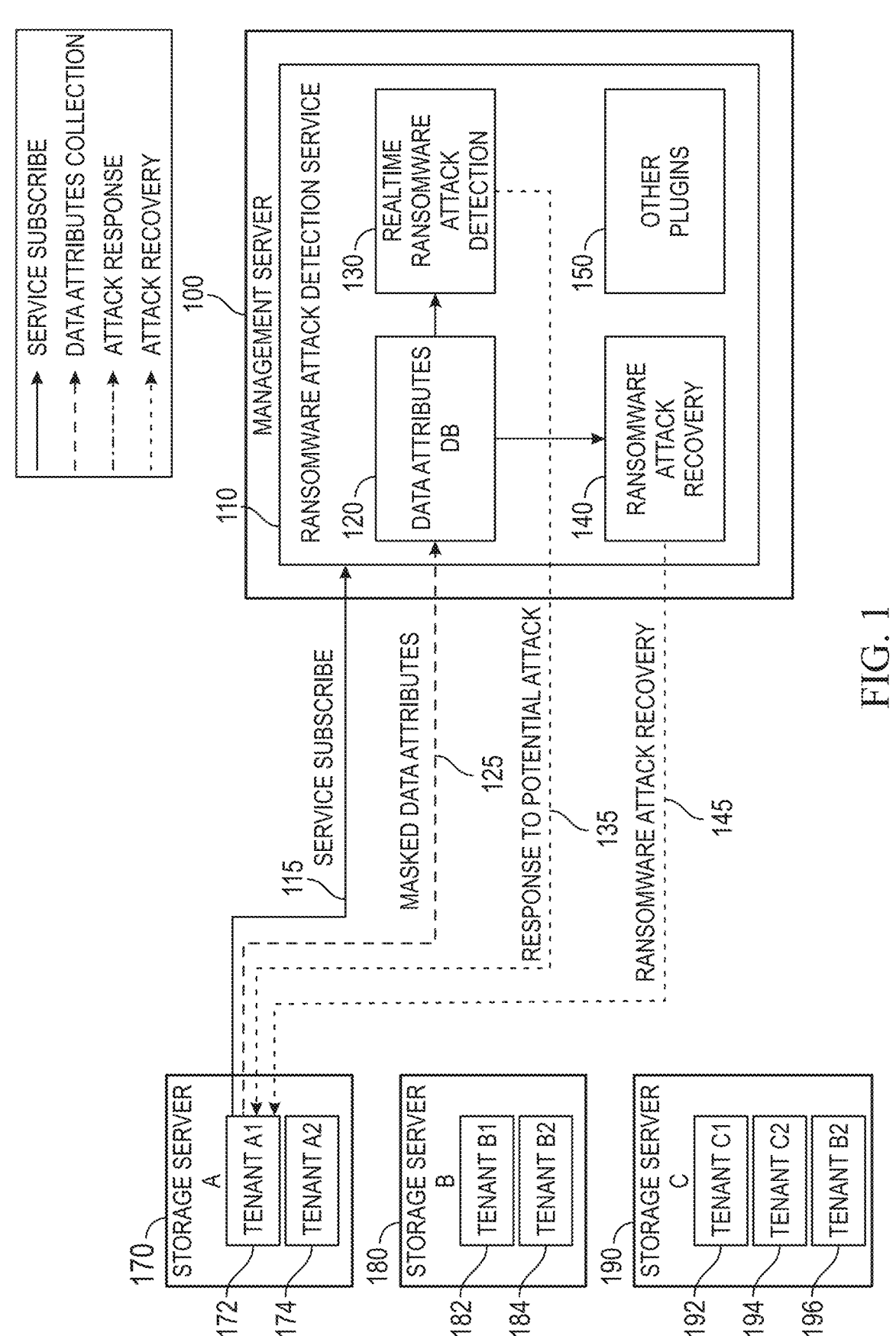
FIG. 1 is a diagram illustrating an example overall system for storage system attack detection and response, according to some embodiments.

Attacks by malware pose a major threat to the security of user data. For example, because data storage servers are used to host important files for users, they are often the target of ransomware attacks. Ransomware is a type of malicious software, or malware, that prevents users from accessing computer files, systems, or networks and demands users pay a ransom for the access. Ransomware replaces files on the hacked device with a version encrypted by a key controlled by the attacker, and once the ransomware has finished encrypting and replacing the user files, it can prevent the user from accessing normal data until a ransom is received. Ransomware attacks can cause costly disruptions to operations and the loss of critical information and data.

Since activities of ransomware generally include routine operations such as reading, writing, creating, and deleting files, it is difficult for a storage system to distinguish between ransomware and itself through behaviors. Thus it cannot detect in time that it has been attacked. In addition, data written by ransomware is generally encrypted data. Since the encrypted data content is random, conventional antivirus methods, such as intrusion detection systems (IDSs), usually cannot effectively detect data modification and cannot assist in data recovery. In some cases, integrity check of files can help detect ransomware attacks, but scanning all files in the storage system continuously is too costly in terms of performance for the storage system. With the emerging trend of Ransomware as a Service (RaaS), more and more variants of the ransomware make ransomware activity detection even harder.

Network-attached storage (NAS) servers are favorable targets for ransomware hacking as they host important shared files for users. There are increasing reports in the last few years on attackers successfully encrypting the data in NAS devices and demanding ransom payment. Ransomware on compromised devices can replace the files in the shared folders with versions encrypted by an attacker-controlled key. Once file encryption and replacement are complete, a user cannot access the data, and the ransomware controller could start to make a ransom demand for the decryption key. Sometimes even if the victims pay the ransom demand, the attackers may still not give the decryption keys and this leads to permanent data loss. Detecting ransomware attack as soon as possible becomes even critical.

To fight with the threats, on-array ransomware attack detecting and recovering mechanisms can be designed to protect user data. But on-array detecting and recovering rely on frequent data collecting and calculating, which can significantly impact the performance of the storage system. For example, a storage array may contain up-to 8000 logical unit numbers (LUNs), 4500 file systems and 256 tenants. To achieve real-time ransomware detection, the data collection in this scenario would be huge, and the calculation requirement would be heavy.

The on-array ransomware attack detection and recovery processes have to be executed on a storage array within the storage system, as they work directly with real user data. The on-array ransomware attack detection consumes CPU and memory resources with frequent processing of the datasets. For a storage system with massive storage objects, where it is common for one storage system to have thousands of storage instances running for multiple tenants, large scale real-time detection will pose a significant performance impact to the storage system. In environments where multiple tenants share the storage system, for example, the performance impact and the complexity of ransomware detection and recovery can harm the user experience. This will interfere with normal user I/O and produce a performance degradation.

The on-array ransomware detection and recovery also increases the operation and maintenance complexity. Each storage server needs to maintain its own anti-ransomware setting, and operation and maintenance is not user friendly. This will harm the user experience. In addition, remote anti-ransomware frameworks can use data compression ratio and data deduplication ratio to reflect the data entropy change in the storage system. But data compression ratio and data dedupe ratio are not sensitive enough and could easily be disguised in a ransomware attack. In addition, using a remote cloud service to do the ransomware detection cannot handle the frequently collected data attributes for a large scale of file systems/LUNs in time. With regard to a remote cloud service, putting a large amount of user data attributes on the cloud may lead to privacy data leaks. Another way to perform ransomware detection and recovery could be to backup or replicate the storage array, and use the backup as source for ransomware detection on the backup array. However, this operation is very time and resource intensive, and it is not a time efficient method.

Some embodiments of the present disclosure provide a solution that minimizes the performance impact that the on-array ransomware detection and recovery mechanisms bring to the storage system, while keeping accuracy and timeliness of the detection and recovery. Offloading ransomware detection calculations for large numbers of objects, as performed by some embodiments of the present disclosure, can provide a large benefit to the storage array's performance.

Some embodiments of the present disclosure, therefore, provide an Anti-Ransomware as a Service (ARaaS) framework to perform ransomware attack detection and recovery with collected data block distribution information from storage systems. Some of these embodiments can offload real-time ransomware detection and recovery to an on-premises management server. The management server can then perform real-time handling of a large amount of frequently collected non-sensitive data attributes, with dataset relationship calculation and dataset clustering. The calculation and clustering can act as a security service. The calculation and clustering at the management server would not impact performance for the storage system compared to on-array detection methods. The design could be applied to protect storage systems and ensure the safety of user data, while having nearly no performance impact on the storage system.

Other embodiments of the present disclosure propose a data detection system and method that use a scoring mechanism based on sampled data to determine the suspicious time of a malware attack. By implementing these embodiments of the present disclosure, a storage system can be protected, and the point in time when it is attacked by malware can be quickly located, which improves checking efficiency, saves checking costs, and helps users to quickly recover stored data.

Multiple embodiments of the present disclosure are typically applicable to storage systems that support in-line deduplication (ILD), but can also be applicable to other storage objects with data sampling and data statistics functions, such as file systems, logical storage units, network storage servers, directories, and the like. Through data sampling and statistics of a storage object, data features of the storage object can be determined.

For the huge amount of stored data of the storage object, a significant portion of the data already stored is duplicated, which wastes storage space and increases the workload of storage. In order to alleviate the space growth problem of the storage system, deduplication technology can be used. Deduplication is a special data compression technique that reduces redundant data, and the technique can effectively improve storage utilization. During the processing of deduplication, through an analysis process, a unique data block is identified and saved, then other data blocks are analyzed and compared with this data block, and a data block that is identical to it will be replaced with a reference to an already existing data block. This can greatly reduce the amount of the stored data. During this analysis process, an encrypted hash (such as MD5 or SHA) can be used to identify whether two data blocks are the same.

The policies of deduplication techniques mainly include file-level deduplication, data block-level deduplication, and byte-level deduplication. The file-level deduplication policy has a high calculation speed, but the granularity thereof is too coarse to accurately identify duplicate data. The data block-level deduplication policy is relatively accurate, but there are many hash values to be calculated because data blocks are taken as units, and hash conflicts may possibly occur. The byte-level deduplication policy performs comparison in bytes without involving hash algorithms, so it can avoid collisions and can thus achieve higher accuracy, but it takes too much time.

In some embodiments, a deduplication policy that combines data block-level and byte-level policies can be chosen. Firstly, a file is split into data blocks, and its hash values are calculated in a unit of data blocks. If the hash value of a new data block matches a certain hash in a device hash index, when they are the same, only a pointer is stored and it points to the original location where the same data block is stored; otherwise, if the data block is unique, it is written to the disk, and its hash value is also stored in the index. In some embodiments, in-line deduplication (ILD) is a function used in some storage systems to simplify data, and refers to the processing computation of deduplication on a target device (or target node) in real time at the same time when the data enters that target device. It is detected whether a similar data block has already exists before a data block is written, and if the device identifies that a certain data block has already been saved in the storage system, it will not save this new data block, but only makes a reference to the existing data block. This can avoid redundant disk data writes, improves the space storage efficiency of the storage system, and reduces network transmission.

In some embodiments of the present disclosure, counting may be performed for deduplicated data blocks of the storage object based on a plurality of statistical features to determine count features of the storage object, wherein the count features include a plurality of count values for the deduplicated data blocks. In some examples, the data blocks in the storage object are matched with the statistical features of the deduplicated data blocks, and the number of respective statistical features in the plurality of statistical features of the deduplicated data blocks of the storage object is counted by using a counter. For example, every time an aligned statistical feature obtained through matching is submitted, the count of the statistical feature is increased by one, and every time a statistical feature is removed, the count is decreased by one. The count features of the storage object are determined based on the counts of the plurality of statistical features of the storage object obtained through counting. Here, the statistical features of the deduplicated data blocks may be, for example, data blocks of 8 KB bytes with fixed length and content that are to be counted.

In some embodiments of the present disclosure, ransomware activities detection is designed based on data sample changes. ILD deduped blocks can be used as the data samples, as the sample distribution change could reflect the data characteristic and entropy change for the storage object. With this design, a ransomware attack scoring system based on correlation coefficient can be used to evaluate the relationships among the sample datasets. Therefore, previous datasets can rate the new dataset to reveal the sample data distribution changes, based on their knowledge on previous data block distribution.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

FIG. 1 is a diagram illustrating an example overall system for storage system attack detection and response, according to some embodiments. In some embodiments, system 100 may be instantiated, at least in part, through the execution of program instructions stored in system memory 1203 and executed by host processor(s) 1201 of IHS 1200.

FIG. 1 depicts a ransomware attack detecting and recovery service framework for storage systems. FIG. 1 depicts multiple multi-tenant storage systems (170, 180, 190), with each multi-tenant storage system used by multiple tenants. For example, storage server A 170 provides storage for tenant A1 172 and tenant A2 174. Storage server B 180 stores storage objects for tenant B1 182 and tenant B2 184. Storage server C 190 stores storage objects for tenant C1 192, tenant C2 194, and tenant C3 196. In some embodiments, the storage object may refer to a file system, a network storage service, a specified file, directory or data (e.g., a snapshot), and the like, which is not limited in the present disclosure. Any one of the tenants associated with any one of the storage servers could subscribe to the ransomware attack detection service 110, and let the management server 100 perform the ransomware detection and recovery. In the example of FIG. 1, tenant A1 172 of storage server A 170 subscribes 115 to the service by sending a service subscribe request 115. In some embodiments, the storage server (e.g., storage server A 170) can subscribe to the ransomware attack detection service 110 on behalf of one of its tenants (e.g., tenant A1 172).

With the service framework of FIG. 1, non-sensitive information about detailed sample data block distribution can be frequently collected and sent to the management server. Tenant A1 172 of storage server A 170 provides masked data attributes 125 to the data attributes database component 120 of the ransomware attack detection service 110. Once the attributes are received, the management server can perform a real-time ransomware attack detection in its real-time ransomware attack detection component 130. When a threat is detected, the real-time ransomware attack detection component 130 can send instructions 135 to the storage instance 172 at the storage server 170. These instructions can provide a response to the potential attack 135.

For a storage system that needs to be recovered from a ransomware attack, the ransomware attack recovery component 140 of the management server 100 can perform a clean snapshot locating service, based on machine learning algorithms to find possible clean snapshot candidates for recovering. The ransomware attack recovery component 140 can provide ransomware attack recovery information 145 to the storage instance 172. The ransomware attack detection service 110 might also include other plugins 150 that perform other actions or services.

In some embodiments, this service framework can be put into a container, and run as a service in an on-premises server (e.g., management server 100) outside the storage servers (170, 180, 190). With the service framework, a large amount of real-time collected data attributes can be processed on the server without the risk of leaking sensitive user data.

Some embodiments of this ransomware detection service framework can provide many benefits, depending on the embodiment. As it only collects and sends the sample data distributions from data I/O path of the storage servers, the ransomware detection and recovery operations are instead performed on the management server. Though data block distributions are frequently collected, and the datasets are in large scale, there will still be minimal performance impact to storage servers. This will help to improve the user experience, while ensuring the user data security.

In addition, some embodiments of this ransomware detection and recovery framework do not need to operate with real user data. Therefore, the service is suitable to be performed on a remote server. In addition, some embodiments of the ransomware detection and recovery framework are able to overcome disguising techniques of ransomware for compression ratio and deduplication ratio. Instead of operating on scalars that can be easily disguised, the data a tenant A1 172 of a storage server A 170 can subscribe to the ransomware attack detection service 110 by sending a service subscribe request 115 to the service at a management server 100. Tenant A1 172 of storage server A 170 provides masked data attributes 125 to the data attributes database component 120 of the ransomware attack detection service 110.

Encryption turns data into high-entropy data, usually indistinguishable from a random stream. Encryption can erase the data characteristics in original data. Therefore, ransomware can also erase data characteristics in the original data, as ransomware will read the files, encrypt the data, write to new files, and then delete the original files. A suspicious outcome of a ransomware attack is, in some embodiments, a decrease of various storage object-level deduplication samples, and a change in deduplicated block distributions, after the original data are removed.

Therefore, in some embodiments, the metrics of the count of deduplicated data blocks, deduplication ratio, deduplicated set, compression ratio, or data of other entropy may be used as data features to help identify whether an attack by malware occurs, which is not limited by the embodiments in the present disclosure. After an attack by malware has occurred, these feature values can produce a significant entropy change.

Inline Pattern Detection (ILPD) pattern data and Inline Deduplication (ILD) deduped block counters can both be used as samples, in some embodiments, to represent data block distributions in a storage system. Counters could be added into I/O path to track the block change. Some embodiments of these counters are depicted in Table 1 below:

TABLE 1

```
uint64_t
PatternCountersPerPattern[MAX_SUPPORT_PATTERN_NUMBER];
// Pattern counters for every ILPD pattern
uint64_t mCountersForILDBlocks[MAX_SAMPLE_BLOCK_NUMBER];
// counters for occurrence of each deduped blocks,
associated with I/O path
``` distribution counters can instead be vectors, in some embodiments, that can keep more knowledge of the user data distribution. These masked counters from the I/O path can include non-sensitive information from the array. Thus, there would be no concern for a real user data leak during the ransomware detection and recovery. However, these embodiments could still keep the accuracy of the ransomware detection.

In addition, some embodiments of the service framework can be storage server friendly, as it can be deployed as a container service. Since the data attributes stored in a database, in some embodiments, these embodiments can implement new plugins to deal with data attributes with machine learning and artificial intelligence algorithms. Meanwhile, the ability to detect unknown variants of ransomware attacks could still be kept within the service framework, in some embodiments, as the ransomware attack detection is still based on the sample data distribution change that reflects the data characteristic.

Figure 2:
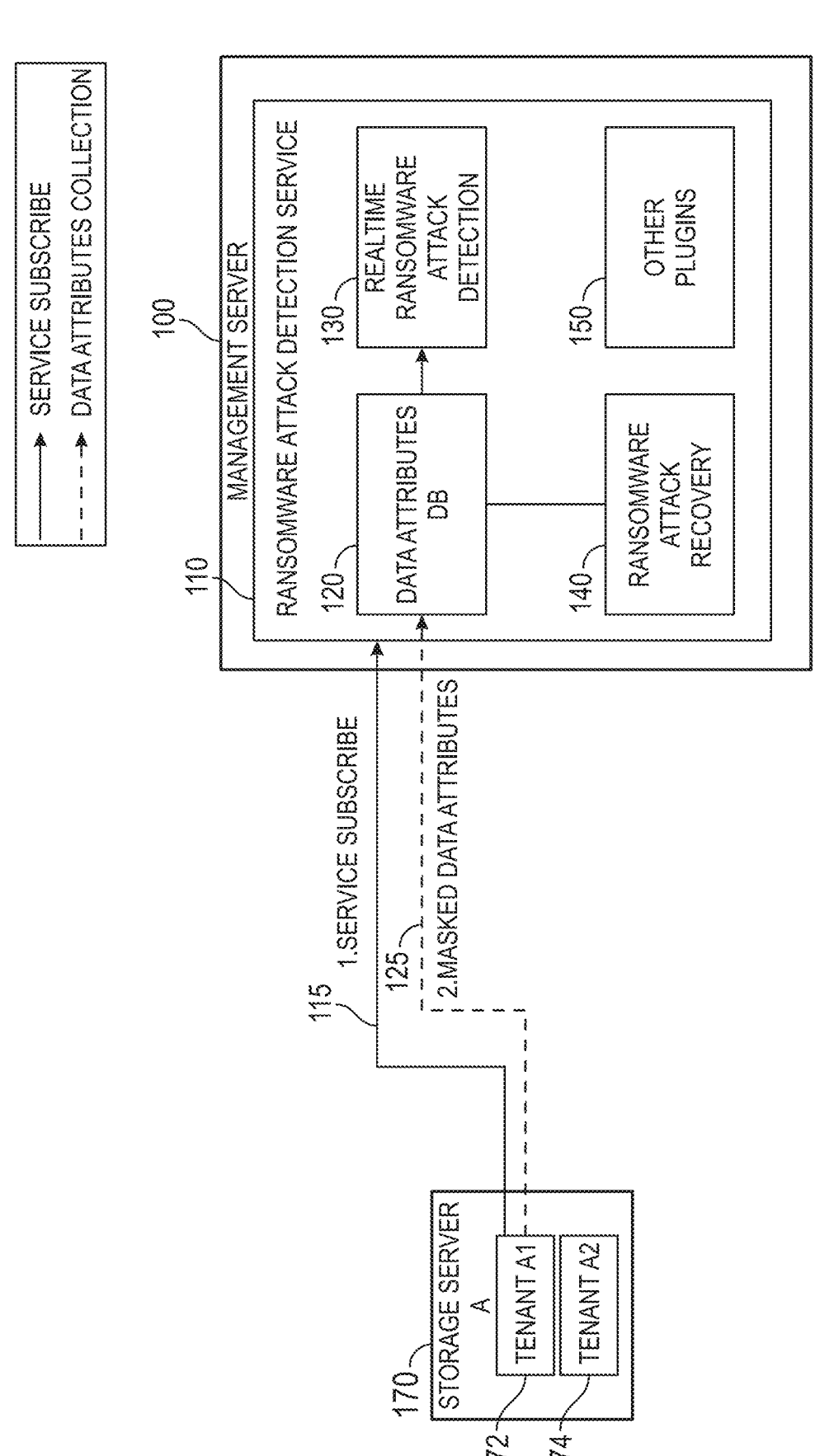
FIG. 2 is a diagram illustrating an example system for storage system attack detection, focusing on subscribing to the service and providing data attributes, according to some embodiments.

FIG. 2 is a diagram illustrating an example system for storage system attack detection, focusing on subscribing to the service and providing data attributes, according to some embodiments. In some embodiments, system 100 may be instantiated, at least in part, through the execution of program instructions stored in system memory 1203 and executed by host processor(s) 1201 of IHS 1200. In FIG. 2, Counters, such as the ones in Table 1, can be updated, in some embodiments with a change from the I/O path. They can be collected by the ransomware attack detection service 110 and then stored as I/O statistics in the data attributes database 120 periodically. Like other I/O counters, they can be provided by the storage server A 170, and then collected and stored in the data attributes database.

Some embodiments collect non-sensitive user data which could be used to reflect data distribution changes. Pattern data block and deduplication block hash keys might leak user data content. Therefore, some embodiments can employ a user defined encryption or hashing that can be applied to the pattern data block and the deduplication block hash keys to mask their user content. The data characteristic from the data distribution can be kept as the pattern data block and deduplication block hash keys, and they can act as an index in the data distribution:

$$\text{Distribution(data blocks)} \rightarrow \text{Distribution(masked index)}$$

For storage objects that enable ransomware attack detection, the storage servers (e.g., storage server A 170) can subscribe 115 to the management server 100 and send the corresponding sample counters 125 to the ransomware detection framework 110. The management server 100 will keep the sample counters in a database 120, and ransomware detection and recovery will be executed based on it.

As the counters are collected from IO path, the frequency of the data collecting could be adjusted to change the sensitivity of the detection. The local on-prem management server could provide the ability to collect and store large scale of real-time datasets and run real-time processing for all storage servers, especially in the APEX environment. Other data attributes could also be collected and sent to the management server as input for ransomware attack detection. These functions could be implemented as plugins to this framework so as to make the framework work more accurate and effective.

Figure 3:
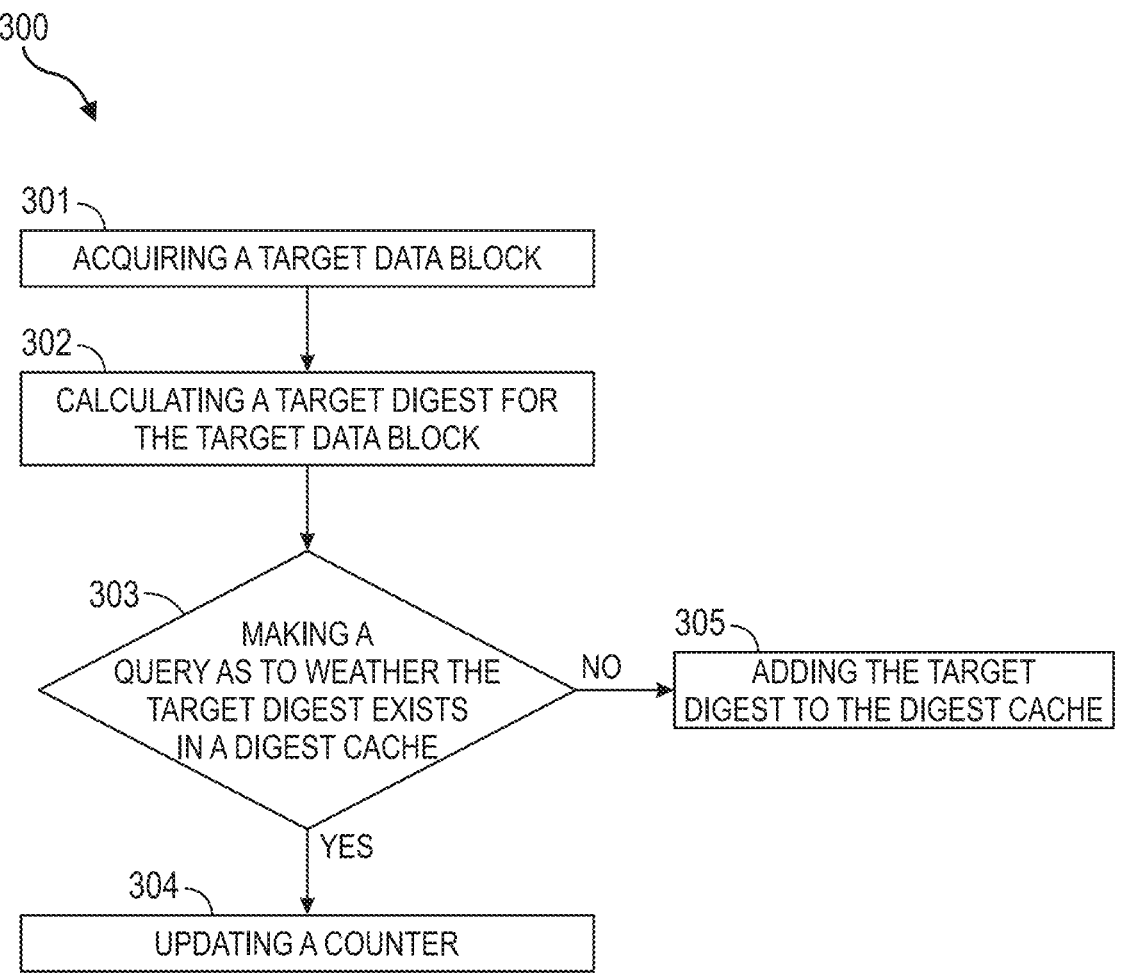
FIG. 3 illustrates a flow chart of a counting method according to some embodiments of the present disclosure.

FIG. 3 illustrates a flow chart of a counting method according to some embodiments of the present disclosure. In some embodiments, method 300 may be performed, at least in part, by operation of the system of FIG. 3.

Referring to the flow chart of a counting method illustrated in FIG. 3, in some embodiments, a digest may be created for the data blocks using a hash function, and data blocks with the same hash value are considered to have the same data block content. At block 301, a target data block is acquired. For example, the target data block is read before being written. At block 302, a target digest for the target data block is calculated. For example, a hash value may be calculated for that target data block.

At block 303, a query is made as to whether this target digest exists in a digest cache, and if so, the process proceeds to block 304 to update a counter, wherein the counter is used to count the number of occurrences of the same deduplicated data block. If not, the process proceeds to block 305 to add the target digest to the digest cache. For example, the target digest is compared with every digest in the temporary digest cache. If the target digest already exists, then the counter is updated by increasing (decreasing) the number for that target digest by one, and if that target digest does not exist in the temporary digest cache, then the new digest is added to the temporary digest cache and is counted afterwards.

It can be understood that the access to data blocks is a dynamic process, and as the number of data blocks increases, the count of the corresponding counter increases accordingly; and as the number of data blocks decreases, the count of the corresponding counter decreases accordingly. In some embodiments, the counting of the number of data blocks in the storage object that conform to the statistical features is set to be performed at a predetermined interval. For example, a counter is called every two hours to count the number of deduplicated data blocks, and scoring is performed for use in helping to discover whether a suspicious attack has occurred. In some examples, statistical feature counters for a plurality of storage objects may also be sent from the storage server to other devices to perform out-of-array checks.

It can be understood that implementations of various embodiments of the present disclosure do not rely on in-line deduplication techniques. In other embodiments, other data patterns, data features, application systems, and statistical methods may be used, and the scope of embodiments of the present disclosure is not limited in this regard.

Figure 4:
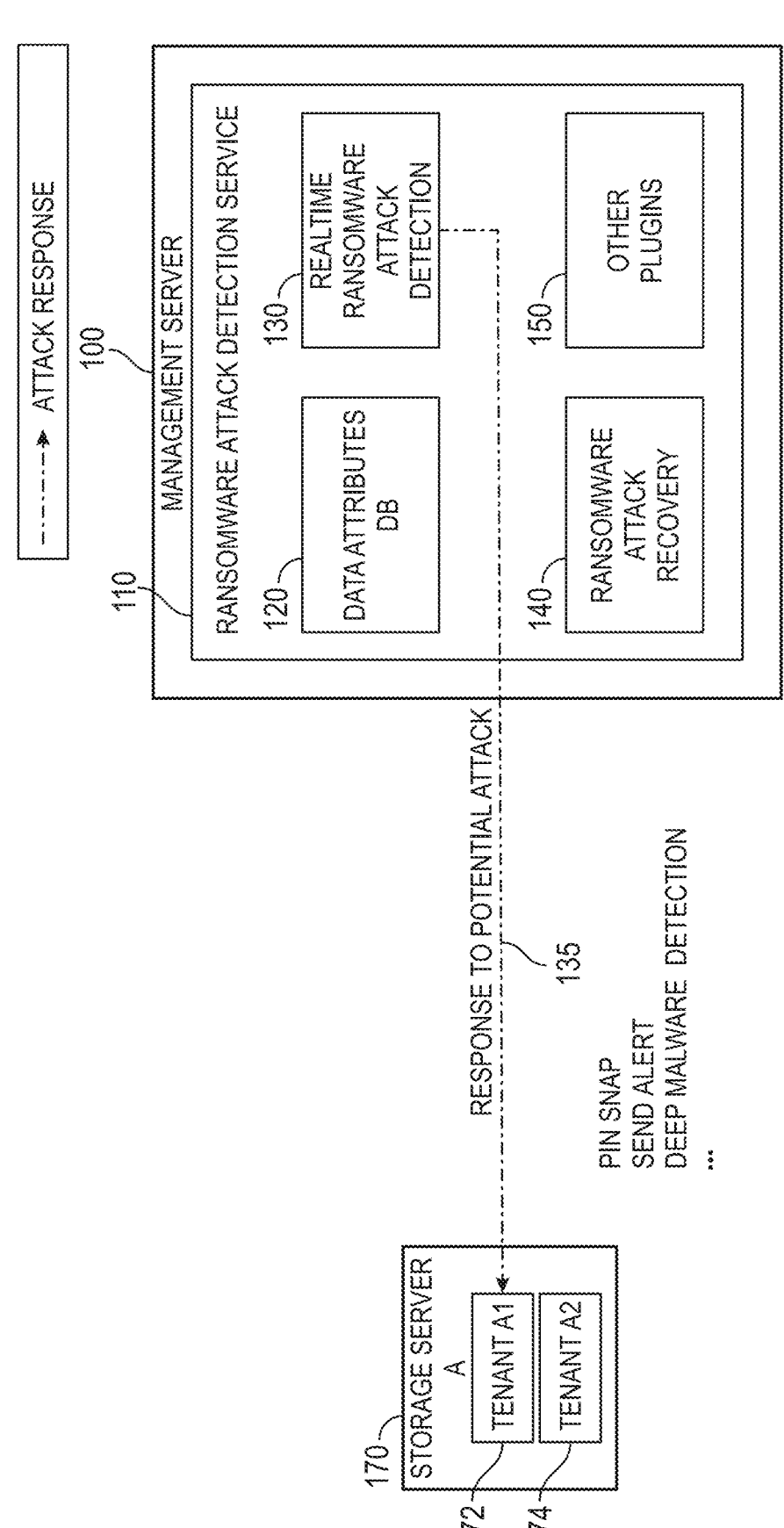
FIG. 4 is a diagram illustrating an example system for storage system attack detection and response, focusing on real-time ransomware attack detection and response to a potential attack, according to some embodiments.

FIG. 4 is a diagram illustrating an example system for storage system attack detection and response, focusing on real-time ransomware attack detection and response to a potential attack, according to some embodiments. In some embodiments, system 100 may be instantiated, at least in part, through the execution of program instructions stored in system memory 1203 and executed by host processor(s) 1201 of IHS 1200.

In FIG. 4, the real-time attack detection component 130 determines if there is a potential ransomware attack.

Embodiments for doing so are described more fully in the succeeding paragraphs. If a possible ransomware attack is detected, the management server 100 and/or the ransomware attack detection service 120 can send a response to a potential attack message 135 to the storage server A 170, according to some embodiments. The response can be a command, in some embodiments. The command can be to pin the snapshots of the storage object to avoid them being deleted, in some embodiments. In some embodiments, an alert can be raised to the administrator to take proper action to handle the issue. If other malware detection software is enabled, it can also trigger a deep malware detection scan.

In order to detect the ransomware attack, in some embodiments, the number of data blocks in the storage object that conform to the statistical features at the plurality of time points can be counted. The count features respectively corresponding to the plurality of time points can be generated according to the number counted. In some embodiments, the statistical features of the data blocks are determined prior to counting the number of the data blocks in the storage object that conform to the statistical features at the plurality of time points, wherein the statistical features of the data blocks may be binary bytes of a predetermined length. In some embodiments, the data blocks are deduplicated data blocks.

In some embodiments, the deduplicated data that is detected and counted may be statistical features of the data blocks. In some embodiments, the counting of the deduplicated data blocks may be automatically performed at a periodic interval (e.g., two hours) as data samples. In some embodiments, the statistical features of the deduplicated data blocks are binary bytes having a predetermined length and content. In some embodiments, the digest of the counted deduplicated data blocks includes multiple items, and since exhaustive counting wastes processing power and storage space, a deduplicated data block with a high duplicate ratio may be selected as a statistical sample, wherein the statistical feature of the deduplicated data block may be an automatically statistically screened deduplicated data block with a duplicate ratio meeting a predetermined threshold.

More specifically, in order to detect the ransomware attack, according to some embodiments, a plurality of corresponding correlation coefficients can be determined based on distances between the count feature for the first time point and count features for the other time points among the plurality of time points. In some embodiments, the score is the average of the plurality of correlation coefficients. In one example, the following algorithms may be used to score data block features to help find out whether the storage object is under suspicious attack. It can be understood that the following scoring approaches are examples only. In other embodiments, other data patterns, data features, application systems, and evaluation algorithms may be used, and the scope of embodiments of the present disclosure is not limited in this regard.

In the examples herein, for any two deduplicated data block count samples, the weight of change in the distribution of sample data may be expressed in terms of Euclidean distance. The count features of the current dataset C with count values of m deduplicated data blocks are denoted as $\{c_0, c_1, c_2 \ldots, c_m\}$, and the count features of the previous old dataset O are denoted as $\{o_0, o_1, o_2, \ldots, o_m\}$. Then, the Euclidean distance $D(CO)$ between C and O is calculated, as in Equation I below:

$$D(C, O) = \sqrt{\sum_{i=0}^{m}(c_i - o_i)^2}$$

Similarly, the sample distribution distance of the deduplicated data between any two sample datasets ($S_x$, $S_y$) can be calculated as $D(S_x, S_y)$. One distance matrix can be generated for all deduplicated sample datasets. Assuming that there are n datasets, the distance matrix is represented as follows:

$$\begin{bmatrix} D(S_0, S_0) & \cdots & D(S_0, S_n) \\ \vdots & \ddots & \vdots \\ D(S_n, S_0) & \cdots & D(S_n, S_n) \end{bmatrix}$$

Based on the distances between the above datasets, correlation coefficients can be used to evaluate the relationship between the vectors of change in the distribution of deduplicated data blocks between the datasets. In an example, the Pearson correlation coefficient of the statistical metric of the linear relationship between two variables is chosen. Two vectors of change in the distribution of deduplicated data blocks are denoted as $X=(x_0, x_1, \ldots, x_n)=(D(S_x, S_0), D(S_x, S_1), \ldots, D(S_x, S_n))$ and $Y=(y_0, y_1, \ldots, y_n)=(D(S_y, S_0), D(S_y, S_1), \ldots, D(S_y, S_n))$. The Pearson correlation coefficient can be calculated using the following Equation II, where $x_i$ and $y_i$ denote different values of X and Y:

$$P(X, Y) = \frac{\sum_{i=0}^{n}(x_i - \bar{x})\,(y_i - \bar{y})}{\sqrt{\left(\sum_{i=0}^{n}(x_i - \bar{x})^2\right)\left(\sum_{i=0}^{n}(y_i - \bar{y})^2\right)}}$$

where the value of the correlation coefficient can be any value between −1 and 1. When the value is (0, 1], it means that the two variables are positively correlated; when the value is [−1, 0), it means that the two variables are negatively correlated; and when the value is 0, it means that the two variables are not correlated. A scoring system is established based on the correlation coefficients between the plurality of deduplicated data samples described above. For the deduplicated block dataset, the correlation coefficient indicates the relationship between the changes in the distribution of deduplicated blocks. In another case, the correlation coefficient is how a dataset is evaluated by other datasets based on the changes in the distribution of data blocks. A scoring system can be established to evaluate the possibility that a storage object is subject to an attack by malware. In an example, for n datasets, the score $T_k$ of the kth dataset can be the average of the correlation coefficients from its sibling datasets (i.e., samples recorded at other time points), which is calculated with reference to the following Equation III:

$$T_k = \frac{\sum_{i \neq k}^{n} P(S_k, S_i)}{n - 1},$$

where $P(S_k, S_i)$ is the Pearson correlation coefficient.

The range of the scores is [−1, 1], which has the same meaning as the correlation coefficient described above. It indicates how a dataset is evaluated by other datasets. Based on this scoring score, a threshold can be set to evaluate whether the storage object may have been attacked by malware.

Figure 5:
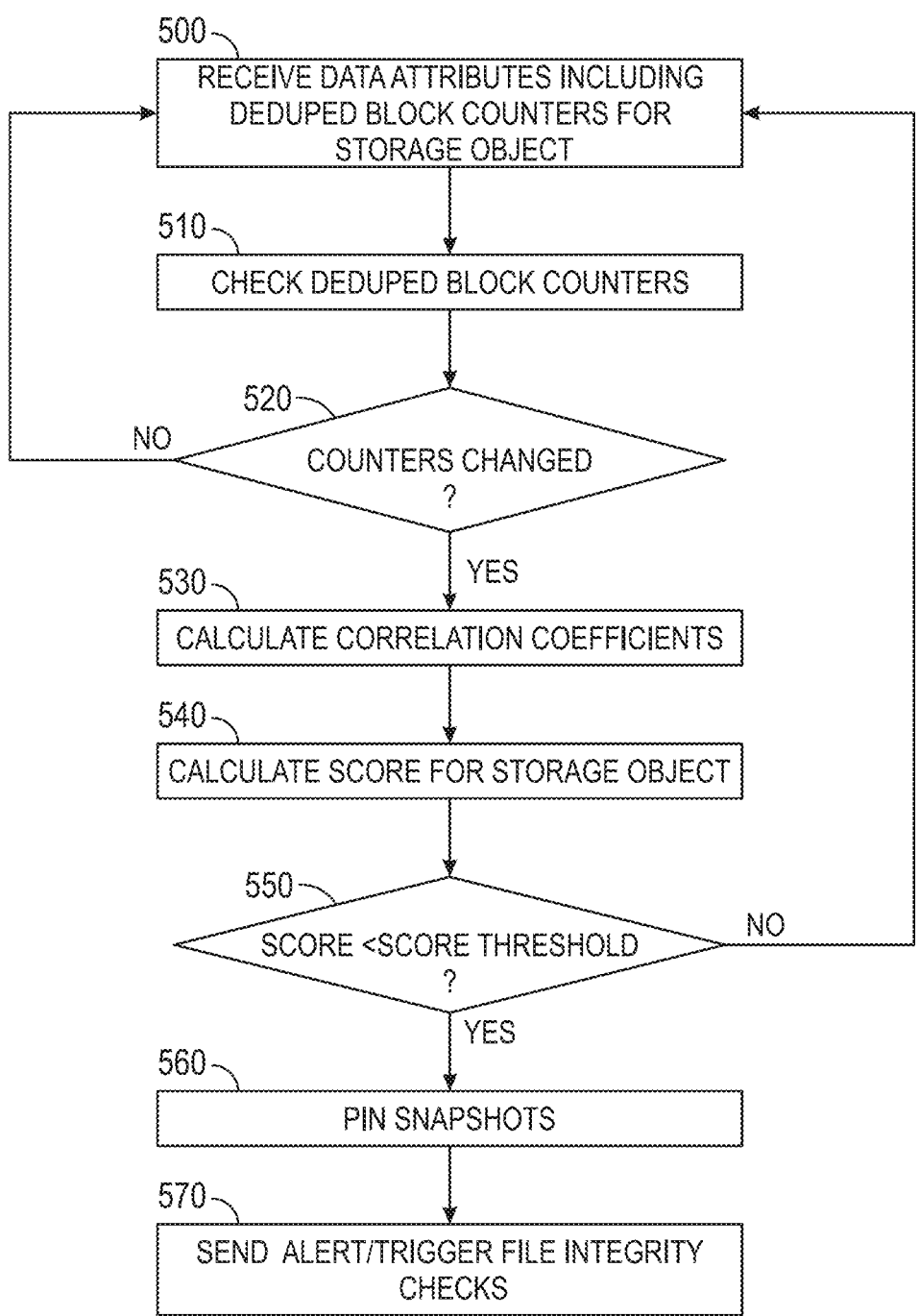
FIG. 5 is a flowchart illustrating an example of a method for storage system attack detection and response with a scoring system, according to some embodiments.

FIG. 5 is a flowchart illustrating an example of a method for storage system attack detection and response with a scoring system, according to some embodiments. In some embodiments, method 500 may be performed, at least in part, by operation of the system of FIG. 4.

The flowchart of FIG. 5 begins at block 500 which a component, such as ransomware attack detection service 110, receives data attributes including deduplicated block counters for a storage object. The flowchart transitions to block 510 which checks the deduplicated block counters. At block 520, the method determines whether the counters have changed. If the counters have not changed the flowchart returns to block 500. If the counters have changed, the flowchart transitions to block 530 which calculates the correlation coefficients. More details regarding calculating the correlation coefficients were explained above with regard to Equation II, according to some embodiments.

After calculating the correlation coefficients, the flowchart transitions to 540 which calculates a score for the storage object. More details regarding calculating the score for the storage object were explained above with regard to Equation III, according to some embodiments. After the score is calculated for the storage object, the flowchart transitions to block 550 which determines whether the score is less than a score threshold. If the score is not less than a score threshold, then the flowchart returns to block 500. If the score is less than a score threshold in decision block 550, then the component implementing this method, such as ransomware attack detection service 110, can provide a response.

The flowchart of FIG. 5 provides some examples of such a response. These examples are merely some types of responses that can be implemented, and therefore should not be construed as limiting. In the example of FIG. 5, the response can be a command, in some embodiments. The command can be to pin the snapshots of the storage object to avoid them being deleted, as shown in block 560. In some embodiments, an alert can be raised to the administrator to take proper action to handle the issue, as shown in block 570. If other malware detection software is enabled, it can also trigger file integrity checks and/or a deep malware detection scan, as also shown in block 570. Other or different types of responses can also be implemented, depending on the embodiment.

Figure 6A:
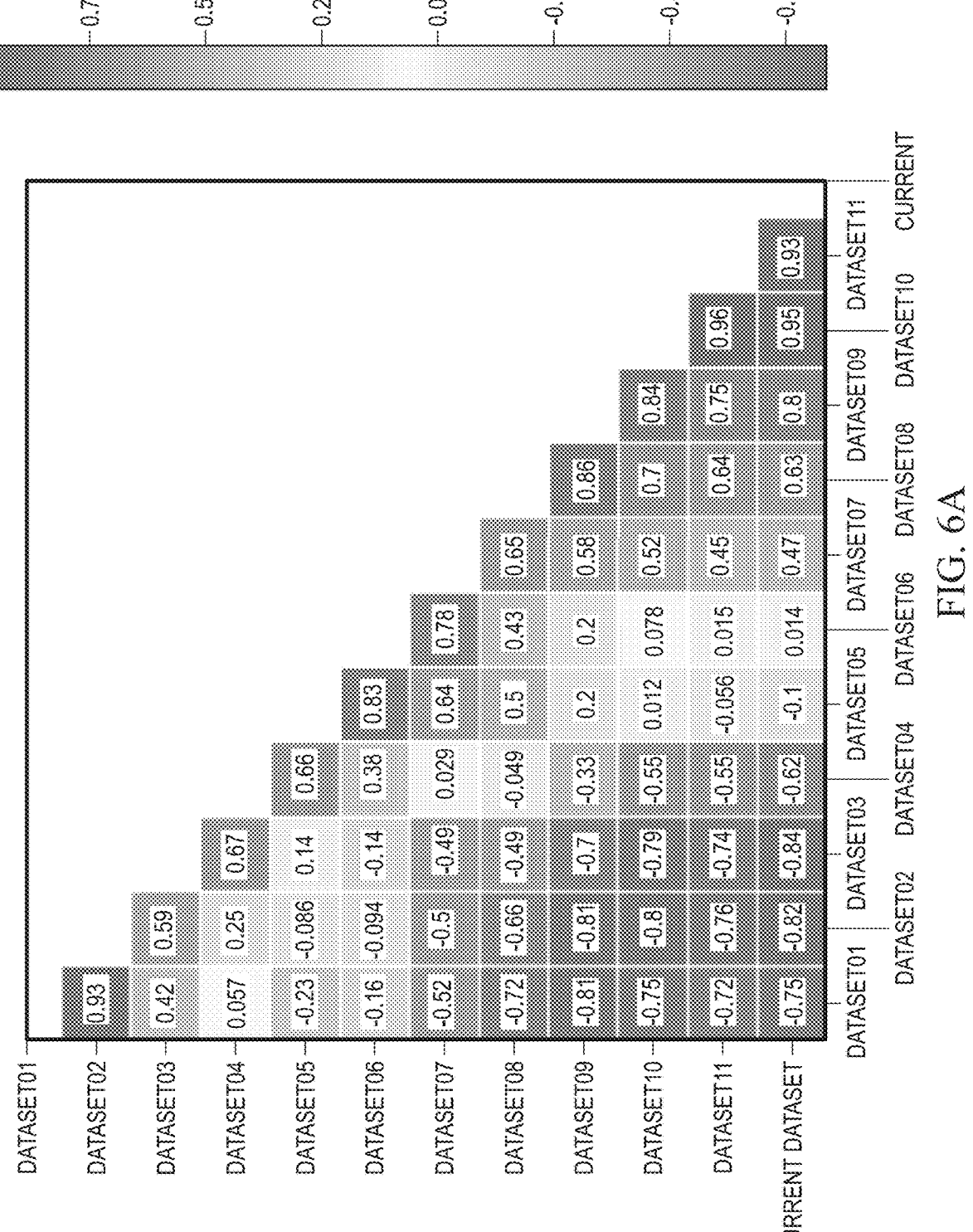
FIG. 6A illustrates a schematic diagram of an example of scoring according to some embodiments of the present disclosure.
Figure 6B:
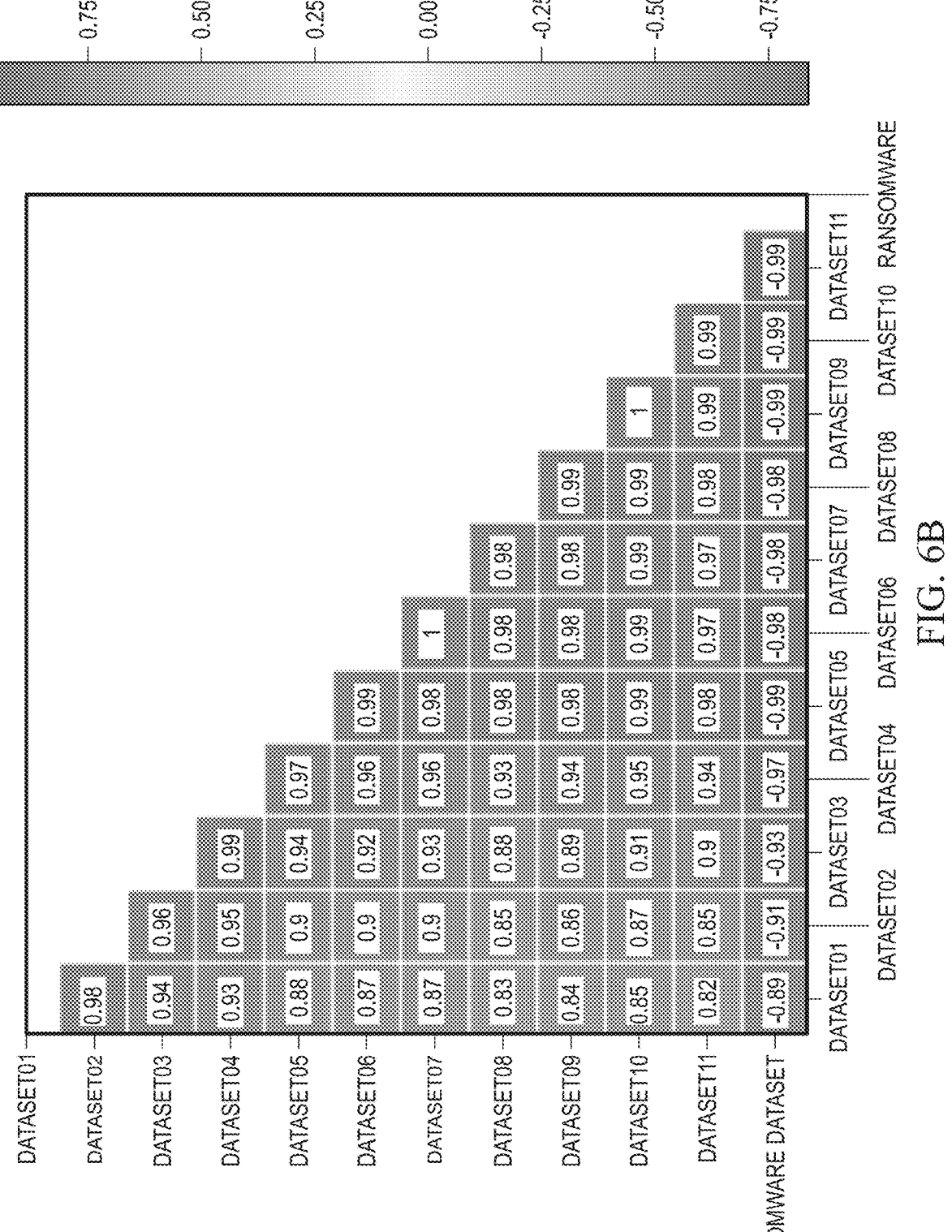
FIG. 6B illustrates another schematic diagram of an example of scoring according to some embodiments of the present disclosure.

FIGS. 6A and 6B illustrate heat map schematic diagrams of scores of datasets according to an example of the present disclosure. FIG. 6A is a heat map of the correlation coefficient of a deduplicated dataset without being attacked in an example. FIG. 6B is a heat map of the correlation coefficient of a deduplicated dataset under a simulated attack in that example. When the malware encrypts files and replaces the original files, it will turn the data into high-entropy data. Therefore, the suspicious result of the malware attack may be a reduction in the count of the statistical features of the plurality of deduplicated blocks of the file system and a change in the distribution of the statistical features of the deduplicated blocks, resulting in a drastic change in the feature values and the associated system.

Referring to FIG. 6A and FIG. 6B, the horizontal and vertical coordinates are identifiers of datasets, including identifiers of a total of 12 datasets from dataset 01 to dataset 11 and the current dataset, and the numbers shown in the quadrant squares are correlation coefficients between the corresponding one dataset and the other dataset. As can be seen in FIG. 6A, the correlation coefficient is gradually changing with time, and the relationship of datasets changes from positive to negative. The correlation coefficient varies smoothly with the changes of adjacent datasets, which indicates that the distribution of the deduplicated data blocks does not fluctuate significantly. Here, the score $T_c$ of the current dataset is:

$$T_c = \frac{\begin{array}{c}(-0.75) + (-0.82) + (-0.84) + (-0.62) + (-0.1) + \\ 0.014 + 0.47 + 0.63 + 0.8 + 0.95 + 0.93\end{array}}{11} \approx 0.0685$$

Since the ransomware attack encrypts the data of the storage object and deletes the files, the change in the distribution of the deduplicated data blocks can be reflected by the correlation coefficients. In an example, a ransomware attack on this storage object is simulated by writing encrypted data, and 20% of the original files are deleted, as can be seen in FIG. 6B, the score $T_r$ for the "ransomware" dataset is:

$$T_c = \frac{\begin{array}{c}(-0.89) + (-0.91) + (-0.93) + (-0.97) + (-0.99) + \\ (-0.99) + (-0.98) + (-0.98) + (-0.99) + (-0.99) + (-0.99)\end{array}}{11} \approx -0.965$$

Further, it can be seen in FIG. 6B that after the ransomware attack, the correlation coefficients of the ransomware dataset change dramatically, and from the previous positive values of correlation coefficients and corresponding scores of dataset 01 to dataset 11, the correlation coefficients and scores of the ransomware dataset suddenly change to negative values, which means that there is a great fluctuation in the distribution of the deduplicated blocks.

In some embodiments, a threshold for scores can be set (e.g., −0.85), and when a score is detected to exceed (be greater than or less than or equal to) the predetermined threshold, it can be determined that the storage system may be under malware attack.

If a possible ransomware attack is detected, the saved snapshots for the storage object can be fixed or frozen to avoid being deleted by a snapshot spin-out policy. At the same time, an administrator can also be alerted to take appropriate actions to address the issue to help quickly locate the suspicious time interval under attack. The user can combine file integrity checking methods such as file name checking, file header checking, and file content checking to improve the accuracy of detection in identifying ransomware attacks. If it is a true threat, the administrator can roll back to a previous clean snapshot to recover data. If it is a false alert, the administrator can unlock the snapshot and reset the counter.

In some examples of the present disclosure, snapshots can be generated every two hours for the storage system, and statistics and analysis for deduplicated data can be performed on the storage system every two hours. After a period of time, the storage system is attacked by malware, and the system makes statistics on and scores the data feature vectors of the deduplicated data blocks and finds the point in time under suspicious attack, for example, the first point in time. Then, a storage snapshot located closest to and earlier than that first point in time would be a good candidate snapshot for the user to check clean snapshots. The way in which the user manually checks snapshots may include detecting the integrity of files, detecting the hash values of the files, and the like, which is not limited in this embodiment.

In some embodiments, after determining that the storage object corresponding to the first time point is under attack, snapshots of the storage object before the first time point are determined to be candidate snapshots, and the candidate snapshots are locked to avoid being deleted. In some embodiments, the candidate snapshots are checked, and a snapshot that corresponds to a time point when the storage system is not under attack by malware and has the latest generation time is selected as a target snapshot. The storage system is recovered to a state corresponding to the target snapshot according to the target snapshot. In some embodiments, after a rollback to a clean target snapshot state, the user can normally access original non-encrypted data, and then the user can use antivirus software to discover and remove malware from the system.

For file systems where the original data is frequently deleted and repopulated with new data, the technical solutions of the present disclosure may not be applicable. In fact, in such file systems, ransomware programs may not be a big threat because files in the system will be quickly deleted. In addition, there may be false alerts due to random user activities. For example, if a user process is writing compressed files to the file system while another user process is deleting a large number of regular files containing deduplicated data blocks, it is difficult to distinguish this scenario from a ransomware attack.

It can be understood that in some embodiments of the present disclosure, in order to improve the accuracy of identifying malware attacks, other file integrity checking methods, such as file name checking, file magic header checking, and file content checking, may be used in combination to check the integrity of files, so as to improve the accuracy of detection in identifying ransomware attacks.

In the data detection solution provided by embodiments of the present disclosure, a deduplicated data block counter in the storage object is used to periodically collect and store the count of in-line deduplications, and based on changes in the distribution of sample data that reflect changes in entropy, unknown variants of ransomware attacks can be detected, so that detection of malware activities can be accomplished at a very low cost. This data detection solution has very little overhead compared with full file system-level file integrity scanning check. In some embodiments, deduplicated data blocks can be selected as data samples because the change in data distribution of the deduplicated data blocks can reflect the change in entropy of a given storage system. In combination with such sample data, a scoring system based on correlation coefficients is introduced to evaluate the relationship between sample datasets so as to identify suspicious malware attacks.

In the scoring system, the system will automatically perform evaluation and scoring to detect attack activities of malware within a time window. Here, the Euclidean distance between the deduplicated data block distributions reflects the difference between the sample datasets. The Pearson correlation coefficient indicates the relationship between the sample datasets. Scoring is performed between a plurality of datasets to reflect the magnitude of change in the distribution of sample data. This technical solution can detect malware attack activities, even if they are unknown new variants of malware, thus getting rid of the limitation of specifically targeting certain malware. This method supports automatic and manual initiation of detection scoring, which can be combined with other anti-ransomware technologies to protect user data. If a potential malware threat is detected, previous snapshots in the storage object will be fixed to avoid being deleted, and an alert is sent to the administrator for the administrator to confirm the threat and take appropriate actions. If a file integrity checking utility exists in the storage system, it can also be launched when a malware attack threat is detected. The administrator can also manually trigger a scoring system to check whether the current working storage object is under attack by malware.

Implementing the above embodiments of the present disclosure and combinations thereof can help to quickly locate the point in time of the effect by malware. Based on the sampling statistics of reads and writes of a plurality of deduplicated data blocks of the storage system, by executing a scoring mechanism on the counting vectors of the plurality of deduplicated data blocks, it is possible to automatically and quickly locate the time range of the effect by malware after the malware attack, thus helping, with relatively low overhead, users to quickly locate the time boundary of the malware attack for faster recovery from the malware attack.

Figure 7:
FIG. 7 illustrates a schematic diagram of functional modules of a system according to some embodiments of the present disclosure.
Figure 7:
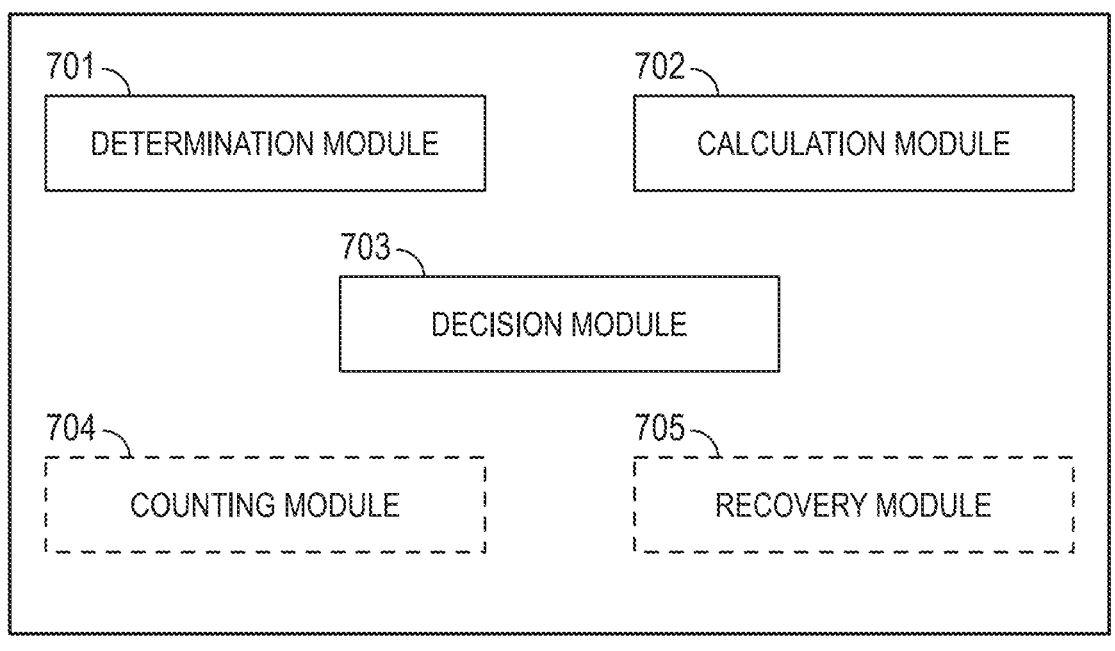

FIG. 7 illustrates a schematic diagram of functional modules of a system according to some embodiments of the present disclosure. In some embodiments, system 700 may be instantiated, at least in part, through the execution of program instructions stored in system memory 1203 and executed by host processor(s) 1201 of IHS 1200.

FIG. 7 illustrates a schematic diagram of functional modules of a ransomware attack detection service 700 according to an embodiment of the present disclosure. In the embodiment of the present application, ransomware attack detection service 700 may be divided into functional modules. For example, various functions of storage system 700 may be divided into various functional modules, or two or more functions of ransomware attack detection service 700 may be integrated into one functional module, which is not limited in this embodiment. This ransomware attack detection service 700 may include determination module 701, calculation module 702, decision module 703, etc. The various functional modules may be implemented by software, hardware, or a combination of both.

Determination module 701 may be configured to determine count features respectively corresponding to a plurality of time points based on data blocks of a storage object. Calculation module 702 may be configured to calculate, for a first time point among the plurality of time points and according to the count features respectively corresponding to the plurality of time points, a plurality of corresponding correlation coefficients between a count feature for the first time point and count features for the other time points among the plurality of time points. Decision module 703 may be configured to determine, if a score determined according to the plurality of correlation coefficients is less than a predetermined threshold, that the storage object corresponding to the first time point is under attack.

In some embodiments, the data blocks are deduplicated data blocks. In some embodiments, determination module 701 may further be configured to determine statistical features of the deduplicated data blocks prior to counting the number of the deduplicated data blocks in the storage object that conform to the statistical features at the plurality of time points, wherein the statistical features of the deduplicated data blocks may be binary bytes of a predetermined length.

Calculation module 702 may further be configured to be able to calculate the plurality of corresponding correlation coefficients based on distances between the count feature for the first time point and the count features for other time points among the plurality of time points. In some embodiments, the score is an average of the plurality of correlation coefficients.

Ransomware attack detection service 700 may further include counting module 704 configured to count the number of deduplicated data blocks in the storage object that conform to the statistical features at the plurality of time points. Counting module 704 is further configured to set to perform, at a predetermined time interval, the counting of the number of the deduplicated data blocks in the storage object that conform to the statistical features.

Ransomware attack detection service 700 may further include recovery module 705 configured to check candidate snapshots and select a snapshot that corresponds to a time point when the storage system is not under attack by malware and has the latest generation time as a target snapshot. The storage system is recovered to a state corresponding to the target snapshot according to the target snapshot. Recovery module 705 may further be configured to determine, after determining that the storage object corresponding to the first time point is under attack, that snapshots of the storage object prior to the first time point are candidate snapshots. The candidate snapshots are locked to avoid being deleted.

By implementing the functional modules of ransomware attack detection service 700 provided by this embodiment, the storage system can be protected, and the point in time when it is attacked by malware can be quickly located, which improves checking efficiency, saves checking costs, and helps users to quickly recover stored data.

It can be understood that the specific implementation of the various functions included in the foregoing various modules may be implemented with reference to the descriptions in the foregoing other embodiments. The modules and/or units may be implemented in part or in whole as hardware modules, software modules, firmware modules, or any combination thereof. In particular, the procedure, method, or process described in some embodiments may be implemented by hardware in a storage system or a host corresponding to the storage system or another computing device independent of the storage system.

Figure 8:
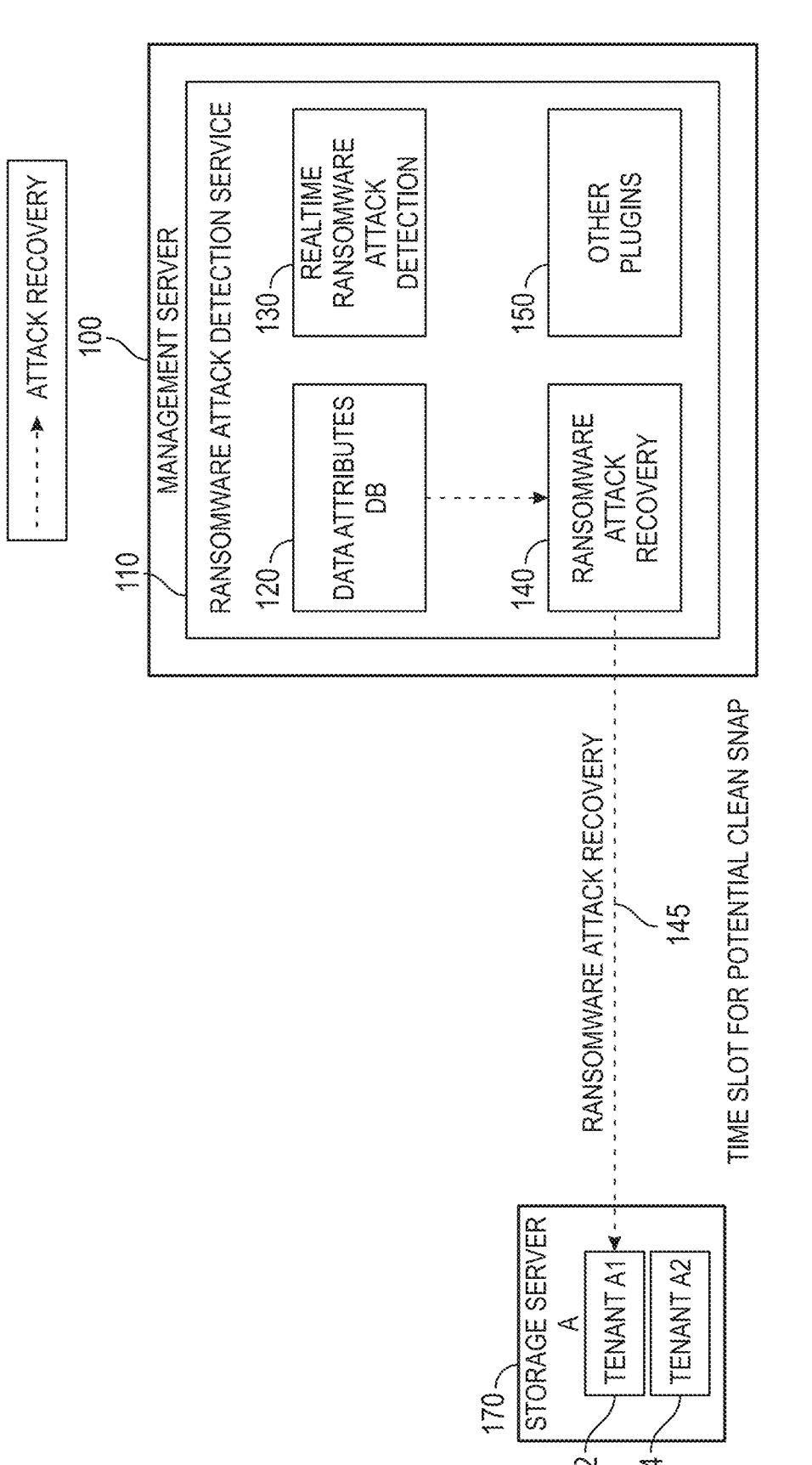
FIG. 8 is a diagram illustrating an example system for storage system attack detection and response, focusing on ransomware attack recovery, according to some embodiments.

FIG. 8 is a diagram illustrating an example system for storage system attack detection and response, focusing on ransomware attack recovery, according to some embodiments. In some embodiments, system 100 may be instantiated, at least in part, through the execution of program instructions stored in system memory 1203 and executed by host processor(s) 1201 of IHS 1200 in FIG. 12.

In some embodiments, a storage snapshot is a set of reference marks for data at a specific point in time, and can be defined as a set of pointers for representing an accessible copy of data stored on a storage device that provides a user with a rollback to the specific point in time. This storage device may be a disk drive, a tape, a network storage server, a storage area network (SAN), or the like. In some embodiments, a snapshot can be considered as a directory, with each pointer describing information or data stored on a disk. A computer may treat this snapshot as a full backup of data. In some examples, snapshots can save the current directory of a file system and the status of subtrees below it, so creating a snapshot is equivalent to backing up every index node in a directory tree (subdirectory trees below the nodes), because the index nodes carry all the information about the file system. Snapshots usually have a small amount of data and occupy a small storage space.

Snapshots can be scheduled to be automatically recorded at a specific time or at a certain frequency, which helps to protect data using automatic snapshot scheduling policies. Snapshots can be used to reduce the threat posed by ransomware, and if a user has a "clean" snapshot of a previous point in time that was not affected by ransomware encryption, then a rollback to the state of the clean snapshot can be performed to eliminate the threat of the attacking program. In some implementations, data can be protected by scheduling snapshots. When a storage system is attacked by malware, normal files and data are replaced by the ransomware with encrypted content. Snapshots corresponding to the stored data under attack may be called "damaged" snapshots.

When an attack is discovered, the user can select a snapshot at a point in time at which the system is not under attack to perform a rollback to quickly restore normal data accesses. It would be tedious and time-consuming to have the user manually install from newest to oldest and check each snapshot to determine which ones are clean and perform a rollback. Usually, as the number of snapshots increases, the storage space occupied by the snapshots also becomes larger. In order to save storage space, the amount of space consumed by snapshots needs to be controlled, and snapshots that exceed the specified storage space threshold or storage number or earlier snapshots of which the retention period has expired will be squeezed out of the storage space and automatically deleted. For files encrypted by malware, even if there are snapshots to protect the data, if the attack activity cannot be discovered in time, the snapshot policy will still delete snapshots, and the saved snapshots may all be damaged snapshots. Moreover, earlier clean snapshots have been deleted, then it may still be impossible to recover clean versions of the data files, resulting in a very large loss of stored data.

In some embodiments of the present disclosure, to get a quick recovery from an exposed ransomware attack, a method to quickly locate any potentially clean snapshots after ransomware attacks in a storage system can be implemented. This method can be based on data sampling and machine learning algorithms, in some of these embodiments. The file encryption and replacement from a ransomware attack can lead to sample data usage change in the storage system. Therefore, in these embodiments, snapshots could be grouped into clean and affected clusters with K-Means clustering, which reflects the data block distribution change impact brought by ransomware attack. A user could roll back to the latest clean snapshot, and therefore recover from the ransomware attack sooner to reduce any possible data unavailability (DU).

In some examples, automatic snapshot creation can be set to be performed at a specific time or at a certain frequency. For example, a snapshot is created every 2 hours based on the current state of the storage object, which helps to protect the stored data, so that it can be restored to the previous storage backup that was not under attack after being attacked by malware.

In some embodiments, changes in data features caused by ransomware attacks can be identified based on data sampling, data statistics, and machine learning, so that the storage object can quickly and effectively find a point in time at which the system is not under attack during ransomware attack recovery. When it is discovered that the storage object may be attacked, the currently saved snapshot can be locked so that it will not be deleted, and then an alert can be sent to the administrator, or the system is triggered for an integrity check. A clean snapshot that has not been attacked by the malware can be found based on that suspicious point in time. Then, based on this clean snapshot, it is possible to help the user recover quickly from the detected ransomware attack.

Referring back to FIG. 8, as the data block distribution of the protected storage objects is collected in the data path, the changes in collected statistics could reflect a possible comprise to a ransomware attack. In the ransomware attack recovery component 140, a clustering could be performed against the collected statistics to distinguish the clean datasets and affected datasets. Some embodiments to implement such a clustering is described in more detail in reference to FIGS. 9-10. The ransomware attack recovery component 140 can provide the affected storage server 170 with ransomware attack recovery information 145. Such ransomware attack recovery information might include a time-slot for a potential clean snapshot or a timestamp of the earliest possible compromised datasets. Either the storage server A 170 and/or the tenant A1 172 can use the timestamp of earliest possible compromised datasets to locate a latest possible unaffected snapshot, and start to run a recovery check based on the latest possible unaffected snapshot.

More specifically, with the collected counters in the data attributes database 120, a K-Means based clustering can be performed against the datasets to find out the possible time slot that the ransomware attack occurred. Then the management server 100 (or the ransomware attack recovery component 140) can send the time slot to the storage server 170 in the ransomware attack recovery information 145. With the time information, the storage server could find the latest possible clean snapshot to start the recovery process.

Figure 9:
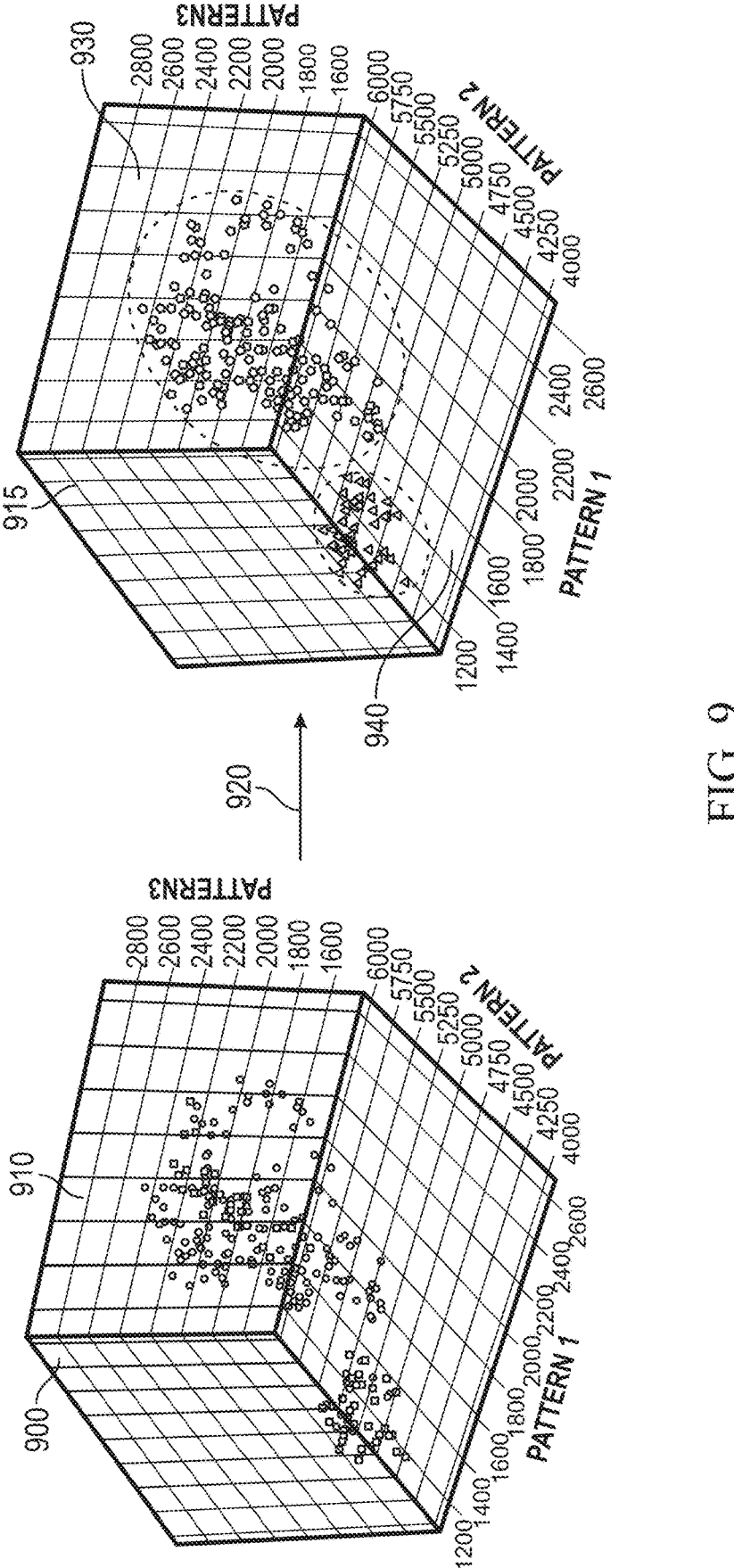
FIG. 9 shows a schematic diagram of an example of clustering according to some embodiments of the present disclosure.

FIG. 9 shows a schematic diagram of an example of clustering according to some embodiments of the present disclosure. FIG. 9 shows a schematic diagram of an example of clustering 900 according to some embodiments of the present disclosure. In the example of FIG. 9, three data patterns (pattern 1, pattern 2, pattern 3) are used to constitute a data feature vector of a snapshot. As shown in FIG. 9, clustering with k=2 can be performed using the K-means clustering algorithm on data feature vectors of a plurality of snapshots. The plurality of data feature vectors in three-dimensional coordinate space 910 are subjected to clustering process 920 and are finally divided into two clusters. In one example, first cluster 930 is considered a group of clean snapshots and second cluster 940 is considered a group of damaged snapshots. This is because when malware encrypts a file and replaces the original file, data is turned into high-entropy data. A suspicious result of a malware attack could be a reduction in the count of a plurality of data patterns in a file system and a change in the distribution of the data patterns.

In some embodiments of the present disclosure, the plurality of data patterns include a first data pattern (e.g., pattern 1), and a count value of the first data pattern of a first snapshot in the first group of snapshots (e.g., first cluster 930) is greater than a count value of the first data pattern of a second snapshot in the second group of snapshots (e.g., second cluster 940), where the first snapshot is a clean snapshot and the second snapshot is a damaged snapshot.

In some embodiments of the present disclosure, when the system detects that the data patterns of the snapshots are changed by a malware attack, it triggers clustering of data features of the plurality of snapshots to help quickly distinguish clean snapshots from damaged snapshots.

In an example of the present disclosure, a snapshot of the storage system is generated every hour; after 72 snapshots are obtained, the storage system is attacked by malware, and after 24 snapshots are continued to be captured, data feature vectors of all the snapshots are subjected to clustering, with a clustering result indicating that the first 72 snapshots on a timeline are classified in one cluster, and the last 24 snapshots are classified in another cluster. In this way, the $72^{nd}$ snapshot at the time boundary of the two clusters will be a good candidate snapshot for the user to check a clean snapshot. The ways for the user to manually check a snapshot may include detecting the integrity of a file, detecting a hash value of the file, or the like, which is not limited in this embodiment.

Figure 10:
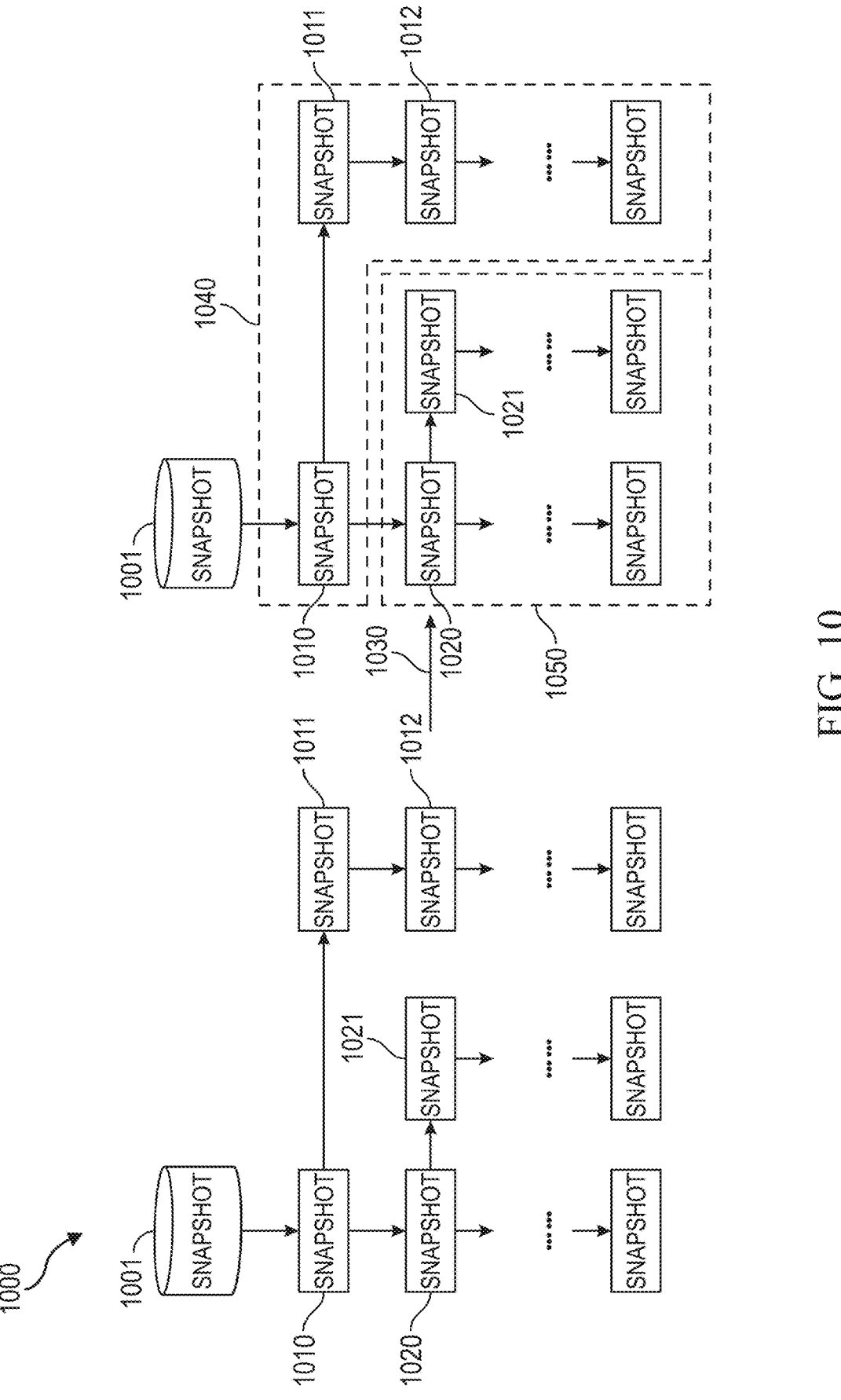
FIG. 10 shows a schematic diagram of an example of classification according to some embodiments of the present disclosure.

FIG. 10 shows a schematic diagram of an example of classification 1000 according to some embodiments of the present disclosure. A snapshot is generated for storage object 1001, and creation of a new snapshot generally refers to an incremental modification performed based on a previous snapshot. As shown in FIG. 10, snapshot 1011 and snapshot 1020 are generated based on snapshot 1010, snapshot 1012 is generated based on snapshot 1011, snapshot 1021 is generated based on snapshot 1020, and so on. After a plurality of snapshots of storage object 1001 are subjected to clustering 1030, a group of clean snapshots 1040 and a group of damaged snapshots 1050 can be distinguished from each other. It can be seen in FIG. 10 that snapshot 1020 is a damaged snapshot, and snapshots generated after snapshot 1020 are all damaged snapshots. The previous snapshot 1010 of snapshot 1020 is a clean snapshot, so when snapshot 1020 is a damaged snapshot, a rollback to a system state of the previous clean snapshot 1010 of snapshot 1020 can be chosen.

It can be understood that when malware encrypts a file and replaces the original file, it turns data into high-entropy data, which is often indistinguishable from a random stream that erases patterns in original data. Therefore, the method for snapshot classification in some embodiments of the present disclosure may not be applicable to a file system where most files are frequently deleted and repopulated with new data. In fact, in such file system, snapshots cannot provide much help to protect data, and malware may not be a big threat either, since the files in the file system may be quickly deleted. In addition, it can be understood that for a storage system with few data patterns, such as a shared folder including all compressed files, the method for snapshot classification in some embodiments of the present disclosure may not be applicable.

It can be understood that, in some embodiments of the present disclosure, in order to improve the accuracy of determining a clean snapshot, other file integrity checking methods, such as file name checking, file magic header checking, and file content checking, may be used in combination to check the integrity of a file, and a rollback is performed after a clean snapshot is found.

By implementing the forgoing embodiments of the present disclosure and their combinations, snapshots that are not affected by malware can be quickly located. Based on data read and write sampling and statistic for the plurality of snapshots of the storage system (such as using the inline pattern detection function) and performing of a machine learning algorithm (such as a clustering algorithm), by classifying the counts of data patterns of the plurality of snapshots, a boundary of clean snapshots unaffected by malware can be quickly and automatically located after the malware attack. This can help the user quickly find the boundary between clean snapshots and damaged snapshots, enabling the user to find the latest clean snapshot with a small number of manual checks, allowing a faster recovery from the malware attack, and reducing the possibility of inaccessible data.

Figure 11:
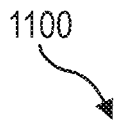
FIG. 11 shows a schematic diagram of functional modules of a system according to some embodiments of the present disclosure.
Figure 11:
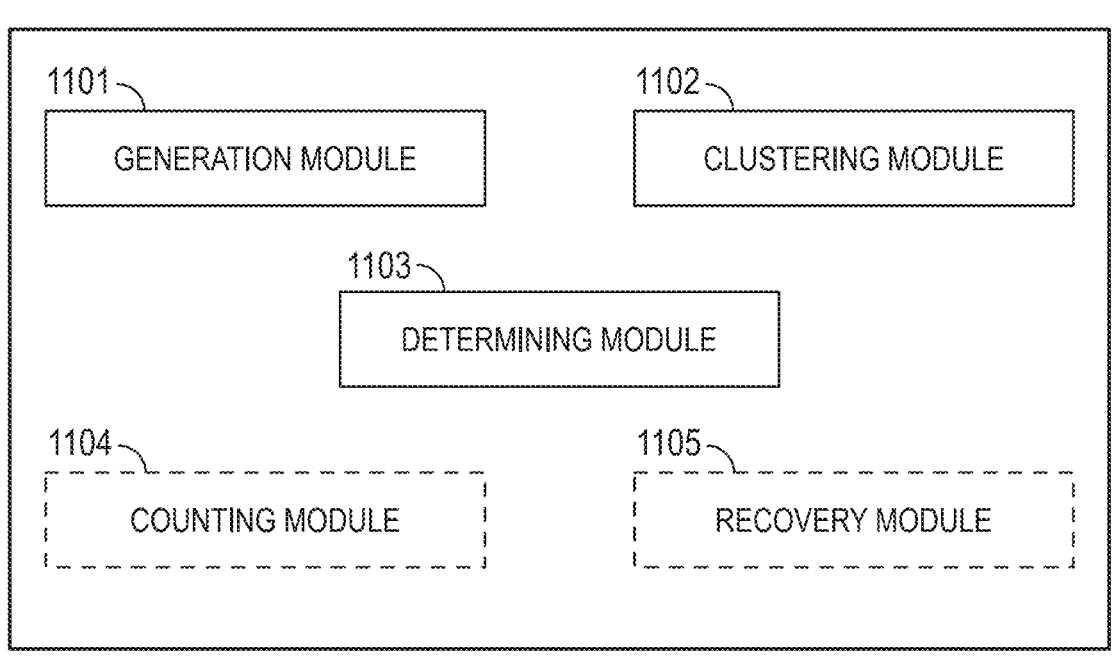

FIG. 11 shows a schematic diagram of functional modules of a ransomware attack detection service 1100 according to some embodiments of the present disclosure. In some embodiments, system 1100 may be instantiated, at least in part, through the execution of program instructions stored in system memory 1203 and executed by host processor(s) 1201 of IHS 1200.

In the embodiment of the present application, ransomware attack detection service 1100 may be divided into functional modules. For example, various functions of ransomware attack detection service 1100 may be divided into various functional modules, or two or more functions of ransomware attack detection service 1100 may be integrated into one functional module, which is not limited in this embodiment. Ransomware attack detection service 1100 may include generation module 1101, clustering module 1102, determining module 1103, and the like. The various functional modules may be implemented by software, hardware, or a combination of both.

Generation module 1101 may be configured to generate a plurality of snapshots of the storage system at multiple times. Clustering module 1102 may be configured to cluster the plurality of snapshots into a first group of snapshots and a second group of snapshots based on data features of the plurality of snapshots. Determining module 1103 may be configured to determine a clean snapshot among the plurality of snapshots based on a comparison between the generation time of the first group of snapshots and the generation time of the second group of snapshots. Herein, the clean snapshots are snapshots of the storage system that have not been subjected to a malware attack, and the damaged snapshots corresponding to the clean snapshots are snapshots that have been subjected to a malware attack.

By implementation of the functional modules of ransomware attack detection service 1100 in this embodiment, a clean snapshot and a damaged snapshot can be automatically and quickly distinguished, thereby improving the efficiency of finding a clean snapshot and helping the user recover data quickly.

Determining module 1103 may also be configured to determine data features of the snapshots based on the snapshots and the plurality of data patterns acquired. In some embodiments, the data patterns are binary bytes of a predetermined length. Determining module 1103 may also be configured to, based on the average generation time of the first group of snapshots being earlier than the average generation time of the second group of snapshots, determine that the first group of snapshots are clean snapshots and the second group of snapshots are damaged snapshots; or, based on a median value of the generation time of the first group of snapshots being earlier than a median value of the generation time of the second group of snapshots, it is determined that the first group of snapshots are clean snapshots and the second group of snapshots are damaged snapshots. Clustering module 1102 may also be configured to perform classification on the plurality of snapshots in response to detecting a malware attack.

Ransomware attack detection service 1100 may further include counting module 1104 configured to, in response to generation of the snapshots, count the number of each data pattern in the plurality of data patterns in the snapshots. Determining module 1103 may further be configured to determine the data features of the snapshots according to the counts of the plurality of data patterns of the snapshots obtained by the counting. Ransomware attack detection service 1100 may further include recovery module 1105 configured to take a snapshot with the latest generation time in the first group of snapshots as a target snapshot. The storage system is recovered to a state corresponding to the target snapshot according to the target snapshot.

It can be understood that the specific implementation of the various functions included in the foregoing various modules may be implemented with reference to the descriptions in the foregoing other embodiments. The modules and/or units may be implemented in part or in whole as hardware modules, software modules, firmware modules, or any combination thereof. In particular, the procedure, method, or process described in some embodiments may be implemented by hardware in a storage system or a host corresponding to the storage system or another computing device independent of the storage system.

Figure 12:
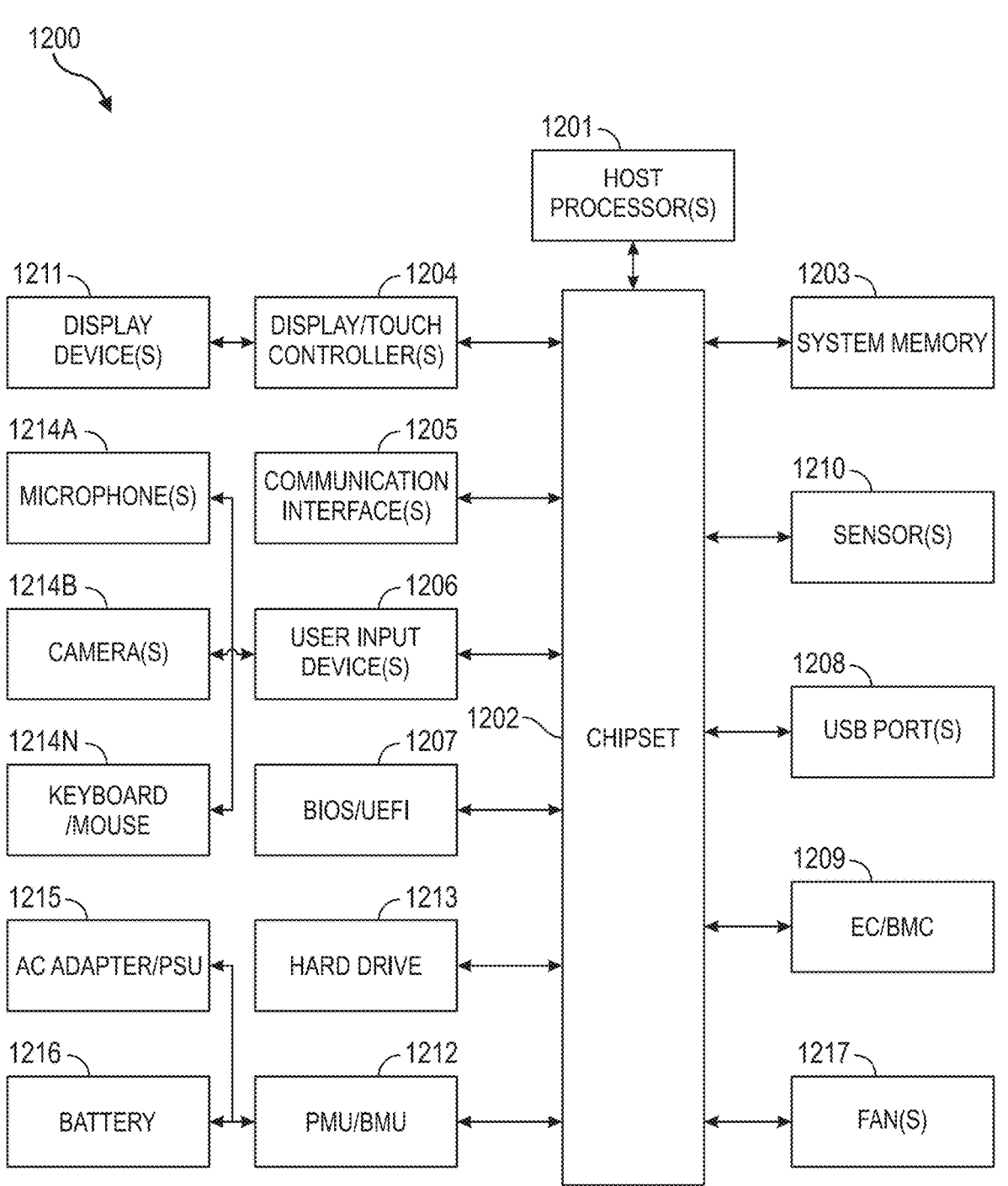
FIG. 12 is a diagram illustrating an example of an environment where systems and methods described herein may be implemented, according to some embodiments.

FIG. 12 is a diagram illustrating an example of an environment where systems and methods described herein may be implemented, according to some embodiments. FIG. 12 is a block diagram of hardware components of IHS 1200, which may be used to implement storage system attack detection and response.

As depicted, IHS 1200 includes host processor(s) 1201. In various embodiments, IHS 1200 may be a single-processor system, or a multi-processor system including two or more processors. Host processor(s) 1201 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 1200 includes chipset 1202 coupled to host processor(s) 1201. Chipset 1202 may provide host processor(s) 1201 with access to several resources. In some cases, chipset 1202 may utilize a QuickPath Interconnect (QPI) bus to communicate with host processor(s) 1201.

Chipset 1202 may also be coupled to communication interface(s) 1205 to enable communications between IHS 1200 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 1205 may also be used to communicate with certain peripherals devices (e.g., BT speakers, microphones, headsets, etc.). Moreover, communication interface(s) 1205 may be coupled to chipset 1202 via a Peripheral Component Interconnect Express (PCIe) bus, or the like.

Chipset 1202 may be coupled to display/touch controller(s) 1204, which may include one or more or Graphics Processor Units (GPUs) on a graphics bus, such as an Accelerated Graphics Port (AGP) or PCIe bus. As shown, display/touch controller(s) 1204 provide video or display signals to one or more display device(s) 1211.

Display device(s) 1211 may include Liquid Crystal Display (LCD), Light Emitting Diode (LED), organic LED (OLED), or other thin film display technologies. Display device(s) 1211 may include a plurality of pixels arranged in a matrix, configured to display visual information, such as text, two-dimensional images, video, three-dimensional images, etc. In some cases, display device(s) 1211 may be provided as a single continuous display, or as two or more discrete displays.

Chipset 1202 may provide host processor(s) 1201 and/or display/touch controller(s) 1204 with access to system memory 1203. In various embodiments, system memory 1203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 1202 may also provide host processor(s) 1201 with access to one or more Universal Serial Bus (USB) ports 1208, to which one or more peripheral devices may be coupled (e.g., integrated or external webcams, microphones, speakers, etc.).

Chipset 1202 may further provide host processor(s) 1201 with access to one or more hard disk drives, solid-state drives, optical drives, or other removable-media drives 1213.

Chipset 1202 may also provide access to one or more user input devices 1206, for example, using a super I/O controller or the like. Examples of user input devices 1206 include, but are not limited to, microphone(s) 1214A, camera(s) 1214B, and keyboard/mouse 1214N. Other user input devices 1206 may include a touchpad, stylus or active pen, totem, etc.

Each of user input devices 1206 may include a respective controller (e.g., a touchpad may have its own touchpad controller) that interfaces with chipset 1202 through a wired or wireless connection (e.g., via communication interfaces (s) 1205). In some cases, chipset 1202 may also provide access to one or more user output devices (e.g., video projectors, paper printers, 3D printers, loudspeakers, audio headsets, Virtual/Augmented Reality (VR/AR) devices, etc.)

In certain embodiments, chipset 1202 may further provide an interface for communications with hardware sensors 1210.

Sensors 1210 may be disposed on or within the chassis of IHS 1200, or otherwise coupled to IHS 1200, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 1200, host processor(s) 1201 may utilize program instructions of Basic Input/Output System (BIOS) 1207 to initialize and test hardware components coupled to IHS 1200 and to load host OS for use by IHS 1200. BIOS 1207 provides an abstraction layer that allows host OS to interface with certain IHS components 1200. Relying upon the hardware abstraction layer provided by BIOS 1207, software stored in system memory 1203 and executed by host processor(s) 1201 can interface with certain I/O devices that are coupled to IHS 1200.

The Unified Extensible Firmware Interface (UEFI) was designed as a successor to BIOS. As a result, many modern IHSs utilize UEFI in addition to or instead of a BIOS. As used herein, BIOS 1207 is intended to also encompass a UEFI component.

Embedded Controller (EC) or Baseboard Management Controller (BMC) 1209 is operational from the very start of each IHS power reset and handles various tasks not ordinarily handled by host processor(s) 1201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 1212, alternating current (AC) adapter/Power Supply Unit (PSU)

1215 and/or battery 1216, allowing remote diagnostics and remediation over network(s) 103, etc.

For example, EC/BMC 1209 may implement operations for interfacing with power adapter/PSU 1215 in managing power for IHS 1200. Such operations may be performed to determine the power status of IHS 1200, such as whether IHS 1200 is operating from AC adapter/PSU 1215 and/or battery 1216.

Firmware instructions utilized by EC/BMC 1209 may also be used to provide various core operations of IHS 1200, such as power management and management of certain modes of IHS 1200 (e.g., turbo modes, maximum operating clock frequencies of certain components, etc.).

In addition, EC/BMC 1209 may implement operations for detecting certain changes to the physical configuration or posture of IHS 1200. For instance, when IHS 1200 as a 2-in-1 laptop/tablet form factor, EC/BMC 1209 may receive inputs from a lid position or hinge angle sensor 1210, and it may use those inputs to determine: whether the two sides of IHS 1200 have been latched together to a closed position or a tablet position, the magnitude of a hinge or lid angle, etc. In response to these changes, the EC may enable or disable certain features of IHS 1200 (e.g., front or rear facing camera, etc.).

In some cases, EC/BMC 1209 may be configured to identify any number of IHS postures, including, but not limited to: laptop, stand, tablet, tent, or book. For example, when display(s) 1211 of IHS 1200 is open with respect to a horizontal keyboard portion, and the keyboard is facing up, EC/BMC 1209 may determine IHS 1200 to be in a laptop posture. When display(s) 1211 of IHS 1200 is open with respect to the horizontal keyboard portion, but the keyboard is facing down (e.g., its keys are against the top surface of a table), EC/BMC 1209 may determine IHS 1200 to be in a stand posture.

When the back of display(s) 1211 is closed against the back of the keyboard portion, EC/BMC 1209 may determine IHS 1200 to be in a tablet posture. When IHS 1200 has two display(s) 1211 open side-by-side, EC/BMC 1209 may determine IHS 1200 to be in a book posture. When IHS 1200 has two displays open to form a triangular structure sitting on a horizontal surface, such that a hinge between the displays is at the top vertex of the triangle, EC/BMC 1209 may determine IHS 1200 to be in a tent posture. In some implementations, EC/BMC 1209 may also determine if display(s) 1211 of IHS 1200 are in a landscape or portrait orientation.

In some cases, EC/BMC 1209 may be installed as a Trusted Execution Environment (TEE) component to the motherboard of IHS 1200.

Additionally, or alternatively, EC/BMC 1209 may be configured to calculate hashes or signatures that uniquely identify individual components of IHS 1200. In such scenarios, EC/BMC 1209 may calculate a hash value based on the configuration of a hardware and/or software component coupled to IHS 1200. For instance, EC/BMC 1209 may calculate a hash value based on all firmware and other code or settings stored in an onboard memory of a hardware component.

Hash values may be calculated as part of a trusted process of manufacturing IHS 1200 and may be maintained in secure storage as a reference signature. EC/BMC 1209 may later recalculate the hash value for a component may compare it against the reference hash value to determine if any modifications have been made to the component, thus indicating that the component has been compromised. In this manner, EC/BMC 1209 may validate the integrity of hardware and software components installed in IHS 1200.

In various embodiments, IHS 1200 may be coupled to an external power source (e.g., AC outlet or mains) through AC adapter/PSU 1215. AC adapter/PSU 1215 may include an adapter portion having a central unit (e.g., a power brick, wall charger, or the like) configured to draw power from an AC outlet via a first electrical cord, convert the AC power to direct current (DC) power, and provide DC power to IHS 1200 via a second electrical cord.

Additionally, or alternatively, AC adapter/PSU 1215 may include an internal or external power supply portion (e.g., a switching power supply, etc.) connected to the second electrical cord and configured to convert AC to DC. AC adapter/PSU 1215 may also supply a standby voltage, so that most of IHS 1200 can be powered off after preparing for hibernation or shutdown, and powered back on by an event (e.g., remotely via wake-on-LAN, etc.). In general, AC adapter/PSU 1215 may have any specific power rating, measured in volts or watts, and any suitable connectors.

IHS 1200 may also include internal or external battery 1216. Battery 1216 may include, for example, a Lithium-ion or Li-ion rechargeable device capable of storing energy sufficient to power IHS 1200 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 1212 governs power functions of IHS 1200, including AC adapter/PSU 1215 and battery 1216. For example, PMU 1212 may be configured to: monitor power connections and battery charges, charge battery 1216, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 1212 may include one or more Power Management Integrated Circuits (PMICs) configured to control the flow and direction or electrical power in IHS 1200. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 1212 may include a Battery Management Unit (BMU) (referred to collectively as "PMU/BMU 1212"). AC adapter/PSU 1215 may be removably coupled to a battery charge controller within PMU/BMU 1212 to provide IHS 1200 with a source of DC power from battery cells within battery 1216 (e.g., a lithium ion (Li-ion) or nickel metal hydride (NiMH) battery pack including one or more rechargeable batteries). PMU/BMU 1212 may include non-volatile memory and it may be configured to collect and store battery status, charging, and discharging information, and to provide that information to other IHS components.

Examples of information collected and stored in a memory within PMU/BMU 1212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 1212. Power draw data may also be monitored with respect to individual components or devices of IHS 1200. Whenever applicable, PMU/BMU 1212 may administer the execution of a power policy, or the like.

IHS 1200 may also include one or more fans 1217 configured to cool down one or more components or devices of IHS 1200 disposed inside a chassis, case, or housing. Fan(s) 1217 may include any fan inside, or attached to, IHS 1200 and used for active cooling. Fan(s) 1217 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 1200 may not include all the components shown in FIG. 12. In other embodiments, IHS 1200 may include other components in addition to those that are shown in FIG. 12. Furthermore, some components that are represented as separate components in FIG. 12 may instead be integrated with other components, such that all or a portion of the operations executed by the illustrated components may instead be executed by the integrated component.

For example, in various embodiments described herein, host processor(s) 1201 and/or other components of IHS 1200 (e.g., chipset 1202, display/touch controller(s) 1204, communication interface(s) 1205, EC/BMC 1209, etc.) may be replaced by discrete devices within a heterogenous computing platform (e.g., a System-On-Chip or "SoC"). As such, IHS 1200 may assume different form factors including, but not limited to: servers, workstations, desktops, laptops, appliances, video game consoles, tablets, smartphones, etc.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, wherein the memory comprises program instructions store thereon that, upon execution by the processor, cause the IHS to:
  obtain a plurality of count features corresponding to a respective plurality of time points based on data blocks of a storage object, wherein the count features comprise a plurality of count values for the data blocks, wherein the data blocks are deduplicated data blocks, and wherein to obtain the plurality of count features corresponding to the respective plurality of time points based on the data blocks of the storage object, the program instructions, upon execution by the processor, further cause the IHS to:
    count the number of the deduplicated data blocks in the storage object that conform to statistical features at the plurality of time points; and
    generate the plurality of count features corresponding to the respective plurality of time points, based, at least in part, on the number of the deduplicated data blocks;
  determine, for a first time point of the plurality of time points, a plurality of corresponding correlation coefficients between a first count feature for the first time point and other count features of the plurality of count features for other time points of the plurality of time points;
  determine a score for the first time point based, at least in part, on the plurality of corresponding correlation coefficients;
  determine that the score is less than a predetermined threshold;
  determine, based at least in part on the score being less than the predetermined threshold, that the storage object corresponding to the first time point is under an attack; and
  provide information responsive to the attack to a third party.

2. The IHS of claim 1, wherein the third party is an entity associated with the storage object, and wherein the program instructions, upon execution by the processor, further cause the IHS to:
  obtain, from the entity associated with the storage object, a subscription to a service performed by the IHS.

3. The IHS of claim 2, wherein the entity associated with the storage object comprises a storage server storing the storage object.

4. The IHS of claim 1, wherein the attack comprises a ransomware attack.

5. The IHS of claim 1, wherein the information responsive to the attack comprises a command to not delete snapshots corresponding to the storage object.

6. The IHS of claim 1, wherein the third party is an administrator associated with the storage object, and wherein the responsive information comprises an alert of the attack.

7. The IHS of claim 1, wherein, responsive to the determination that the storage object corresponding to the first time point is under the attack, the program instructions, upon execution by the processor, further cause the IHS to:
  cluster the plurality of count features corresponding to the respective plurality of time points into a first group of count features and a second group of count features, based, at least in part, on the plurality the of count values for the data blocks;
  compare a time point of the first group of count features with a time point of the second group of count features; and
  determine, based at least in part on the comparison, a second time point of the plurality of time points, wherein the storage object corresponding to second time point is not under the attack, and wherein the information responsive to the attack provided to the third party comprises the second time point.

8. The IHS of claim 7, wherein the program instructions, upon execution by the processor, further cause the IHS to:
  determine that snapshots of the storage object prior to the second time point are candidate snapshots, wherein the responsive information comprises a command to not delete the candidate snapshots.

9. The IHS of claim 1, wherein the program instructions, upon execution by the processor, further cause the IHS to:
  determine the plurality of corresponding correlation coefficients based on distances between the first count feature for the first time point and the other count features of the plurality of count features for other time points of the plurality of time points.

10. The IHS of claim 1, wherein the score is an average of the plurality of correlation coefficients.

11. A method of determining an attack on a storage system, comprising:
  obtaining a plurality of count features corresponding to a respective plurality of time points based on data blocks of a storage object, wherein the count features comprise a plurality of count values for the data blocks, wherein the data blocks are deduplicated data blocks, and wherein the obtaining the plurality of count features corresponding to the respective plurality of time points based on the data blocks of the storage object further comprises:
    counting the number of the deduplicated data blocks in the storage object that conform to statistical features at the plurality of time points; and
    generating the plurality of count features corresponding to the respective plurality of time points, based, at least in part, on the number of the deduplicated data blocks;
  determining, for a first time point of the plurality of time points, a plurality of corresponding correlation coefficients between a first count feature for the first time point and other count features of the plurality of count features for other time points of the plurality of time points;
  determining a score for the first time point based, at least in part, on the plurality of corresponding correlation coefficients;
  determining that the score is less than a predetermined threshold;
  determining, based at least in part on the score being less than the predetermined threshold, that the storage object corresponding to the first time point is under an attack; and
  providing information responsive to the attack to a third party.

12. The IHS of claim 1, wherein the program instructions, upon execution by the processor, further cause the IHS to:

determine the statistical features of the data blocks prior to counting the number of the deduplicated data blocks in the storage object that conform to the statistical features at the plurality of time points, wherein the statistical features are binary bytes of a predetermined length.

13. The method of claim 12, further comprising:

determining the statistical features of the data blocks prior to counting the number of the deduplicated data blocks in the storage object that conform to the statistical features at the plurality of time points, wherein the statistical features are binary bytes of a predetermined length.

14. The method of claim 11, wherein the third party is an entity associated with the storage object, and wherein the method further comprises:

obtaining, from the entity associated with the storage object, a subscription to a service performed by an Information Handling System (IHS).

15. The method of claim 11, wherein the attack comprises a ransomware attack.

16. The method of claim 11, wherein responsive to determining that the storage object corresponding to the first time point is under the attack, the method further comprises:

clustering the plurality of count features corresponding to the respective plurality of time points into a first group of count features and a second group of count features, based, at least in part, on the plurality of count values for the data blocks;

comparing a time point of the first group of count features with a time point of the second group of count features; and determining, based at least in part on the comparison, a second time point of the plurality of time points, wherein the storage object corresponding to second time point is not under the attack, and wherein the information responsive to the attack provided to the third party comprises the second time point.

17. The method of claim 16, further comprising:

determining that snapshots of the storage object prior to the second time point are candidate snapshots, wherein the responsive information comprises a command to not delete the candidate snapshots.

18. A memory coupled to a processor in an Information Handling System (IHS), wherein the memory comprises program instructions stored thereon that, upon execution by the processor, cause the IHS to:

obtain a plurality of count features corresponding to a respective plurality of time points based on data blocks of a storage object, wherein the count features comprise a plurality of count values for the data blocks, wherein the data blocks are deduplicated data blocks, and wherein to obtain the plurality of count features corresponding to the respective plurality of time points based on the data blocks of the storage object, the program instructions, upon execution by the processor, further cause the IHS to:

count the number of the deduplicated data blocks in the storage object that conform to statistical features at the plurality of time points; and generate the plurality of count features corresponding to the respective plurality of time points, based, at least in part, on the number of the deduplicated data blocks;

determine, for a first time point of the plurality of time points, a plurality of corresponding correlation coefficients between a first count feature for the first time point and other count features of the plurality of count features for other time points of the plurality of time points;

determine a score for the first time point based, at least in part, on the plurality of corresponding correlation coefficients;

determine that the score is less than a predetermined threshold;

determine, based at least in part on the score being less than the predetermined threshold, that the storage object corresponding to the first time point is under an attack; and provide information responsive to the attack to a third party.

19. The memory of claim 18, wherein the program instructions, upon execution by the processor, further cause the IHS to:

determine the statistical features of the data blocks prior to counting the number of the deduplicated data blocks in the storage object that conform to the statistical features at the plurality of time points, wherein the statistical features are binary bytes of a predetermined length.

* * * * *